United States Patent

Itou et al.

[11] Patent Number: 6,119,518
[45] Date of Patent: *Sep. 19, 2000

[54] ANGULAR VELOCITY SENSOR

[75] Inventors: Takeshi Itou, Okazaki; Yasushi Matsuhiro, Nukata-gun; Muneo Yorinaga, Anjo; Kazushi Asami, Okazaki; Yoshimi Yoshino, Anjo; Kazuhiko Miura, Yokkaichi, all of Japan

[73] Assignees: Nippon Soken, Inc., Nishio; Denso Corporation, Kariya, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,044

[22] Filed: Aug. 5, 1997

[30] Foreign Application Priority Data

Aug. 5, 1996 [JP] Japan ................................. 8-221734

[51] Int. Cl.⁷ .......................................................... G01P 9/00
[52] U.S. Cl. .......................................................... 73/504.16
[58] Field of Search ........................ 73/504.12, 504.16, 73/504.14, 504.15, 504.02; 310/329, 321, 370, 367

[56] References Cited

U.S. PATENT DOCUMENTS

| | | | |
|---|---|---|---|
| 4,598,585 | 7/1986 | Boxenhom | 73/505 |
| 4,628,734 | 12/1986 | Watson | 73/505 |
| 4,694,696 | 9/1987 | Hojo et al. | 73/504.16 |
| 4,699,006 | 10/1987 | Boxenhom | 73/517 AV |
| 5,016,072 | 5/1991 | Greiff | 357/26 |
| 5,216,315 | 6/1993 | Terada et al. | 310/329 |
| 5,216,490 | 6/1993 | Greiffe et al. | 73/517 R |
| 5,329,816 | 7/1994 | Söderkuist et al. | 73/504.16 |
| 5,349,857 | 9/1994 | Kasanami et al. | 73/505 |
| 5,386,726 | 2/1995 | Terajima | 73/505 |
| 5,388,458 | 2/1995 | Weinberg et al. | 73/504.16 |
| 5,461,916 | 10/1995 | Fujii et al. | 73/514.32 |
| 5,481,913 | 1/1996 | Ito et al. | 73/504.16 |
| 5,500,549 | 3/1996 | Takeuchi et al. | 257/415 |
| 5,504,356 | 4/1996 | Takeuchi et al. | 257/254 |
| 5,522,249 | 6/1996 | Macy | 73/1 D |
| 5,585,562 | 12/1996 | Kurata et al. | 73/504.16 |
| 5,625,145 | 4/1997 | Maeno et al. | 73/504.12 |
| 5,895,851 | 4/1999 | Kano et al. . | |

FOREIGN PATENT DOCUMENTS

| | | |
|---|---|---|
| 60-213813 | 10/1985 | Japan . |
| 61-114123 | 5/1986 | Japan . |
| 61-191917 | 8/1986 | Japan . |
| 62-19714 | 1/1987 | Japan . |
| 63-172447 | 7/1988 | Japan . |
| 3-120415 | 5/1991 | Japan . |
| 3-131713 | 6/1991 | Japan . |
| 4-134208 | 5/1992 | Japan . |
| 4-142420 | 5/1992 | Japan . |
| 6-147903 | 5/1994 | Japan . |
| 8-5382 | 1/1996 | Japan . |
| 8-111459 | 4/1996 | Japan . |

*Primary Examiner*—Richard A. Moller
*Attorney, Agent, or Firm*—Pillsbury Madison & Sutro LLP

[57] ABSTRACT

An angular velocity sensor includes a tuning-fork oscillator having a pair of arms jointed by a trunk, the pair of arms extending in parallel to each other, first and second driving piezoelectric elements arranged only on one surface of the trunk with a gap therebetween in an extending direction of the arms, and angular velocity detecting piezoelectric elements arranged on surfaces of the arms in parallel with the one surface of the trunk on which the first and second piezoelectric elements are arranged.

14 Claims, 15 Drawing Sheets

FIG. 13
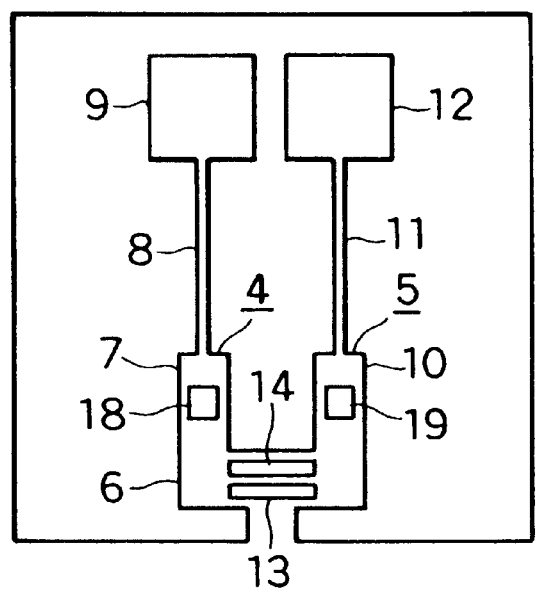
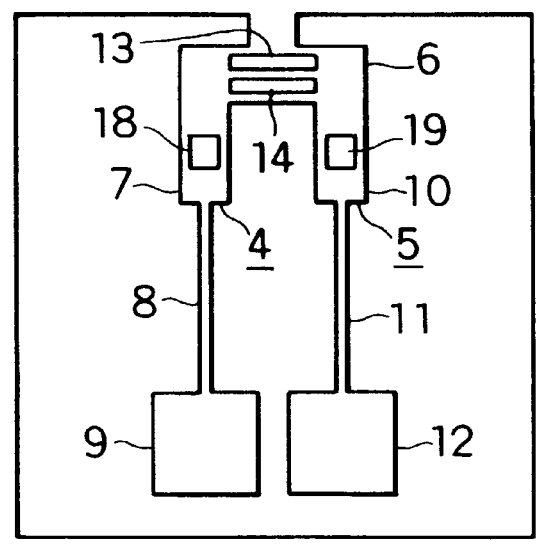

ANGULAR VELOCITY SENSOR

CROSS REFERENCE TO RELATED APPLICATION

This application is based upon and claims priority from Japanese Patent Application No. Hei. 8-221734 filed Aug. 5, 1996, the contents of which are incorporated by reference.

BACKGROUND OF THE INVENTION

1. Field of the Invention

The present invention relates to an angular velocity sensor for measuring an angular velocity by using a piezoelectric oscillation type gyro, and this sensor is used for measuring the moving state of a moving body such as a vehicle, ship, airplane or robot.

2. Related Arts

There is known an oscillation type angular velocity sensor using piezoelectric elements (as disclosed in Japanese Patent Application Laid-Open No. 61-191917 or 62-19714, for example). In this oscillation type angular velocity sensor, as shown in FIG. 19, driving piezoelectric elements 33 and 34 and detecting piezoelectric elements 35 and 36 are perpendicularly arranged because Coriolis force to be generated in the direction perpendicular to the driven oscillating direction has to be detected. Specifically, in the typical oscillation type angular velocity sensor having the piezoelectric elements adhered to a metallic oscillator 37, the driving piezoelectric elements 33 and 34 and the detecting piezoelectric elements 35 and 36 are arranged on the orthogonal planes to make a stereoscopic structure.

However, this structure has a problem that its manufacturing process is required to have steps of adhering the individual piezoelectric elements to different faces of the oscillator, so that the manufacturing process becomes complicated. Further, according to this structure, a size of the angular velocity sensor becomes large.

In Japanese Patent Application Laid-Open No. Hei 6-147903, there has been proposed an angular velocity sensor in which a silicon substrate is etched from its two faces to form an integral oscillator in the substrate and in which driving or detecting piezoelectric thin films are laminated on the surfaces of the oscillator. According to this construction, the oscillator, the drive unit, the detection unit and the peripheral circuits are integrated on the substrate so that a small angular velocity sensor can be achieved.

However, this angular velocity sensor has problems that the drive signal to be applied for operating the sensor to the drive unit is caused to flow around the wiring line of feedback elements or detection elements by the induction or the electrostatic capacity coupling to cause noises, thereby making the drive signal unstable or to deteriorate the detection accuracy of the sensor. Especially, the angular velocity sensor, in which the oscillator is formed by etching the silicon substrate, is seriously influenced by the signal flow-around because it is small-sized to have its individual units close to each other.

As the method for reducing the signal flow-around, there is disclosed in Japanese Patent Application Laid-Open No. Hei. 3-131713, for example, an angular velocity sensor which is constructed such that the capacity coupling between the individual wiring lines of the drive unit and the detection unit are interrupted. Specifically, there is arranged in a terminal insulating portion, in which driving terminals and detecting terminals are buried, an earth plate for isolating the driving terminals and the detecting terminals. At the same time, a portion of the earth plate is exposed from the terminal insulating portion to the outside so that the exposed portion of the earth plate is arranged between the wiring lines of the individual terminals, and the sections of the sensor, as not reached by the earth plate, are electrostatically shielded by grounding the metallic oscillation plate, which is arranged between the two terminals, to the earth.

By this method, however, the shield is not complete and so the signal flow-around cannot be completely prevented, whereby it is difficult to eliminate the noises.

SUMMARY OF THE INVENTION

A first object of the present invention is to provide an angular velocity sensor which is given a novel structure such that its manufacturing process is simplified.

A second object of the present invention is to improve the detecting accuracy of the angular velocity sensor by preventing the signal flow-around between the drive unit and the detection unit.

In order to achieve the aforementioned first object, an angular velocity sensor according to the present invention comprise a tuning-fork oscillator having a pair of arms jointed by a trunk, said pair of arms extending in parallel to each other, first and second driving piezoelectric elements arranged only on one surface of the trunk with a gap therebetween in an extending direction of the arms, and angular velocity detecting piezoelectric elements arranged on surfaces of the arms in parallel with the one surface of the trunk, on which the first and second piezoelectric elements are arranged.

Due to this construction, the oscillator is driven (or excited) by the first and second driving piezoelectric elements on a plane in parallel with the one surface of the trunk, on which the first and second piezoelectric elements are arranged. Because these first and second driving piezoelectric elements are mounted only on the one surface of the trunk, the area of the angular velocity detecting piezoelectric elements can be sufficiently retained on the arms to improve the sensitivity. When the oscillator is driven by the first and second driving piezoelectric elements, the arms of the oscillator are liable to be also displaced in the direction perpendicular to the one surface of the trunk by the expansions/contractions of the first and second piezoelectric elements. However, the first and second driving piezoelectric elements are mounted only at the trunk so that the unnecessary displacement can be minimized.

Each of the arms may desirably include a wide arm portion extending from the trunk, a narrow arm portion extending from the wide arm portion and made narrower than the wide arm portion, and a mass portion jointed to the narrow arm portion. In addition, the angular velocity detecting piezoelectric elements may desirably be mounted on the surfaces of the wide arm portions. In this case, the stresses resulting from the oscillations of the arms are concentrated at the joints between the wide arm portions and the narrow arm portions. As a result, the stresses resulting from the oscillations are suppressed from acting upon the angular velocity detecting piezoelectric elements. As a result, the S/N ratio of the angular velocity sensor can be improved. The amplitude of the oscillations of the arms can be enlarged by the mass portions to improve the sensitivity.

When one of the first and second driving piezoelectric elements is driven to expand, the other is preferably driven to contract. This can be achieved by inverting the phases of the AC voltages to be applied to the first and second driving piezoelectric elements. This drive improves the driving efficiency by the first and second driving piezoelectric element.

Here, the first and second driving piezoelectric elements are mounted only on the one surface of the trunk, as described above. Therefore, the paired arms of the oscillator are liable to be also displaced in the direction perpendicular to the one surface of the trunk. These unnecessary oscillations, if any, can be suppressed by making the level of the voltage to be applied to the driving piezoelectric element which is placed close to the arms, lower than the level of the voltage to be applied to the driving piezoelectric element which is placed apart from the arms.

On the basis of the processing errors or the errors on the mounting positions of the first and second driving piezoelectric elements, moreover, the paired arms may be oscillated in opposite directions to each other along the direction perpendicular to the one surface of the trunk. In this case, the unnecessary oscillations of the paired arms in the opposite directions can be suppressed by halving the first and/or second driving piezoelectric element corresponding to the paired arms and by making the voltage level to be applied to one of the halved driving piezoelectric elements higher than the voltage level to be applied to the other driving piezoelectric element.

Here, the aforementioned unnecessary oscillations can be suppressed not by adjusting the levels of the voltages to be applied to the first and second driving piezoelectric elements relative to each other but by adjusting the areas of the first and second driving piezoelectric elements. In this case, the relative enlargement of the areas of the driving piezoelectric element is effective like the relative rise of the level of the applied voltage. In order to keep the magnitude of the amplitudes of the oscillations of the paired arms, it is important to retain the lengths of the first and second driving piezoelectric elements between the paired arms. Therefore, it is desirable to adjust the areas by changing the widths of the first and second driving piezoelectric elements in the extending direction of the arms.

On the other hand, if the ends of the first and second driving piezoelectric elements extends out of the center line along the extending direction of the arms, the oscillations of the arms on the plane parallel to the one surface of the trunk are disturbed. Therefore, the first and second driving piezoelectric elements are desirably formed on one surface of the trunk such that they are positioned between the individual center lines of the paired arms.

When the oscillator is made of a semiconductor substrate and when the individual piezoelectric elements are made by laminating a thin film electrode material and a thin film piezoelectric material, the angular velocity sensor can be manufactured by using the micro-machine technique.

In order to achieve the aforementioned second object, an angular velocity sensor according to the present invention comprises a semiconductor oscillator formed in a semiconductor substrate by etching the semiconductor substrate, an oscillation exciting unit formed in the surface of the semiconductor oscillator for exciting the oscillation of the semiconductor oscillator, and an oscillation detecting unit for detecting the oscillation of the semiconductor oscillator. At least ones of electrode wiring lines to be connected with the oscillation exciting unit and electrode wiring lines to be connected with the oscillation detecting unit are covered on their surfaces with a shield film.

When the electrode wiring lines to be connected with the oscillation detecting unit are covered all over their surfaces with the shield film, they can be shielded from the other electrode wiring lines so that the signal flowing-around can be reliably prevented by the relatively simple construction. Similar effects can be achieved when the electrode wiring lines for the oscillation exciting unit are covered with the shield film.

More specifically, the electrode wiring lines to be shielded are covered on their surfaces with a conductive film through an insulating film, and the conductive film is electrically connected with the semiconductor substrate to use the conductive film as the shield film. The oscillation exciting unit or the oscillation detecting unit may be made of a piezoelectric thin film and can be easily formed by laminating piezoelectric thin films on the substrate by using the thin film forming technique. Moreover, the semiconductor substrate may be suitably exemplified by a silicon substrate.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 13 is a front elevation of an angular velocity sensor of another example;

DESCRIPTION OF THE PREFERRED EMBODIMENTS

First Embodiment

A first embodiment of the present invention will be described with reference to the accompanying drawings.

Figure 1:
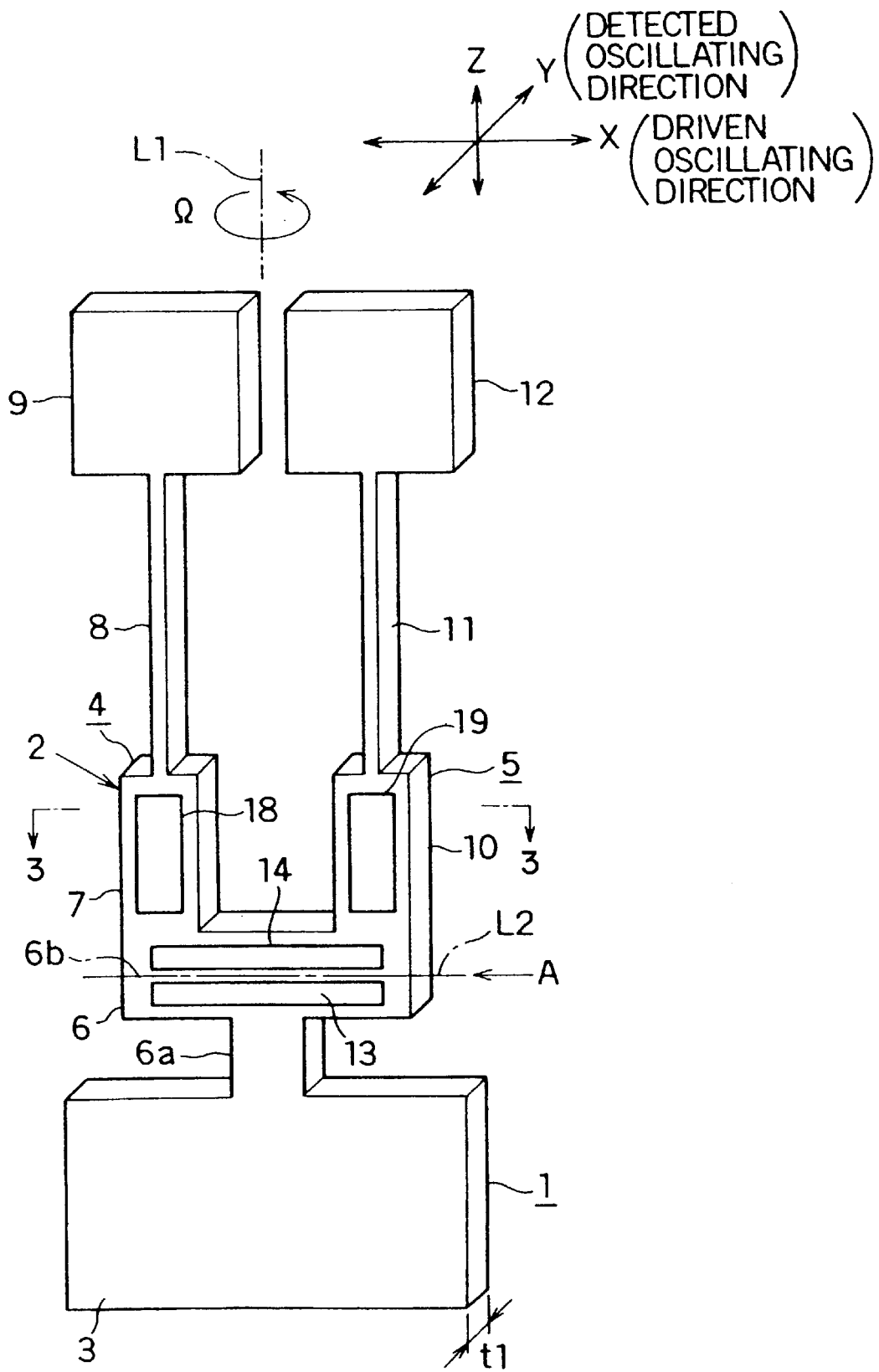
FIG. 1 is a perspective view of an angular velocity sensor according to a first embodiment.

An angular velocity sensor of this embodiment is shown in FIG. 1. In the following description, the three-axis orthogonal coordinate system is given, which includes a transverse direction indicated by X (i.e., X-axis), a longitudinal direction indicated by Y (i.e., Y-axis), and a vertical direction indicated by Z (i.e., Z-axis).

The angular velocity sensor is constructed of a flat metal plate 1 having a predetermined thickness t1. This metal plate is made of a material of constant elasticity such as Elinvar (i.e., an alloy of Ni—Cr—Ti—Fe).

A tuning-fork shaped oscillator 2 is formed by hollowing out a portion of the metal plate 1 and is positioned upright.

This oscillator 2 is constructed to include: a square stationary body 3; arms 4 and 5 extending vertically in parallel to each other; and a trunk 6 jointing the arms 4 and 5 to the stationary body 3. The arm 4 is composed of a wide arm portion 7 having a rectangular shape, a narrow arm portion 8, and a mass portion 9. Likewise, the arm portion 5 is also composed of a wide arm portion 10 having a rectangular shape, a narrow arm portion 11, and a mass portion 12.

The trunk 6 has a T-shape and is composed of a vertical portion 6a which extends upward from the upper face of the stationary body 3, and a horizontal portion 6b which extends to the right and left from the upper end portion of the vertical portion 6a. The wide arm portion 7 extends upward from the upper face of the lefthand end of the horizontal portion 6b, and the wide arm portion 10 extends upward from the upper face of the righthand end of the horizontal portion 6b.

From the upper end of the rectangular wide arm portion 7, moreover, there extends upward the narrow arm portion 8, from the upper end of which extends upward the mass portion 9 having a square shape. From the upper end of the rectangular wide arm portion 10, likewise, there extends upward the narrow arm portion 11, from the upper end of which extends upward the mass portion 12 having a square shape.

To the front face on the horizontal portion 6b of the trunk 6 of the oscillator 2, there are adhered a pair of upper (first) and lower (second) driving piezoelectric elements 13 and 14. These first and second driving piezoelectric elements 13 and 14 are formed into band shapes extending in the X direction and are arranged in parallel with each other.

The arms 4 and 5 of the angular velocity sensor are driven to oscillate in the X direction by applying AC signals of different phases individually to the first and second driving piezoelectric elements 13 and 14 so as to make them different in the expanded/contracted state.

These driving piezoelectric elements 13 and 14 are arranged in an upper portion and a lower portion of the trunk 6, as shown in FIG. 1, with respect to an axis L2 passing through a boundary in which the distribution of stress established in the trunk 6 changes from the tensile stress to the compressive stress when the trunk 6 is bent (i.e., the axis L2 is a center axis of bending of the trunk 6). As a result, the forces which are caused by the extension/contractions of the two piezoelectric elements 13 and 14 are favorably transmitted to the arms 4 and 5.

This arrangement is effective for oscillating the arms 4 and 5 efficiently in the X direction.

In a preferable method for driving arms 4 and 5 to oscillate, moreover, the AC signals of the opposite phases are applied to the first and second driving piezoelectric elements 13 and 14. Since the expanded/contracted states of the two piezoelectric elements 13 and 14 are inverted in this method, the transmission of the forces which are caused by the expansions/contractions to the arms 4 and 5 can be optimized without being eliminated.

Since the elongation percentage of the piezoelectric element is proportional to its own length, the larger expansions of the piezoelectric elements can be utilized for driving to oscillate the arms 4 and 5 by forming the first and second piezoelectric elements 13 and 14 into the band shape extending in the X direction, as shown in FIG. 1.

However, when the end portions of the two piezoelectric elements 13 and 14 extend outwardly beyond the vertical center axes of the arms 4 and 5 on the Z axis, namely, to the outside of the center axes of bending of the arms 4 and 5, the oscillations of the arms 4 and 5 are suppressed. It is, therefore, preferable that the first and second driving piezoelectric elements 13 and 14 be interposed between the vertical center lines of the arms 4 and 5.

Here, the arrangement of the first and second driving piezoelectric elements 13 and 14 should not be limited to the aforementioned one, but can be modified such that the piezoelectric elements 13 and 14 are spaced vertically as a pair only in the region above or below the bending center axis L2 of the trunk 6. In this case as well, the arms 4 and 5 can be oscillated in the X direction.

On the other hand, only one driving piezoelectric element may be arranged in the trunk 6. In this modification, the piezoelectric element is made asymmetrical with respect to the bending center axis L2 so that the resultant force to act on the arms 4 and 5 as a result of the expansion/contraction of the piezoelectric element may be oriented in the X direction. As a result, the arms 4 and 5 can be driven to oscillate.

Figure 2:
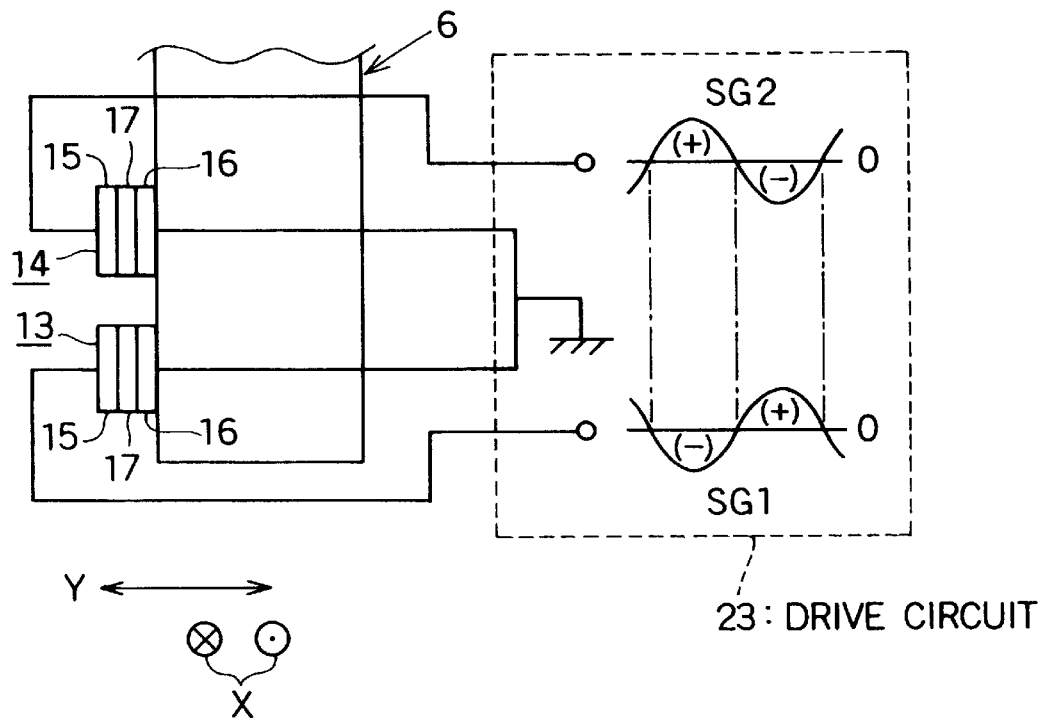
FIG. 2 is a side view of the angular velocity sensor, as viewed from the direction of arrow A of FIG. 1.

Here will be detailed these piezoelectric elements 13 and 14. As shown in FIG. 2 presenting a side view (as viewed from the direction of arrow A) of FIG. 1, each of the piezoelectric elements 13 and 14 has a laminated structure by sandwiching a piezoelectric material 17 between electrode plates 15 and 16. This lamination is made in the Y direction. Moreover, the driving piezoelectric elements 13 and 14 are given equal areas.

To the front face of the wide arm portion 7 of the oscillator 2, as shown in FIG. 1, there is adhered a detecting piezoelectric element 18. To the front face of the wide arm portion 10 of the oscillator 2, too, there is adhered a detecting piezoelectric element 19. These detecting piezoelectric elements 18 and 19 are formed into a rectangular shape elongating in the vertical direction (i.e., in the Z direction) and are arranged at the same height.

Figure 3:
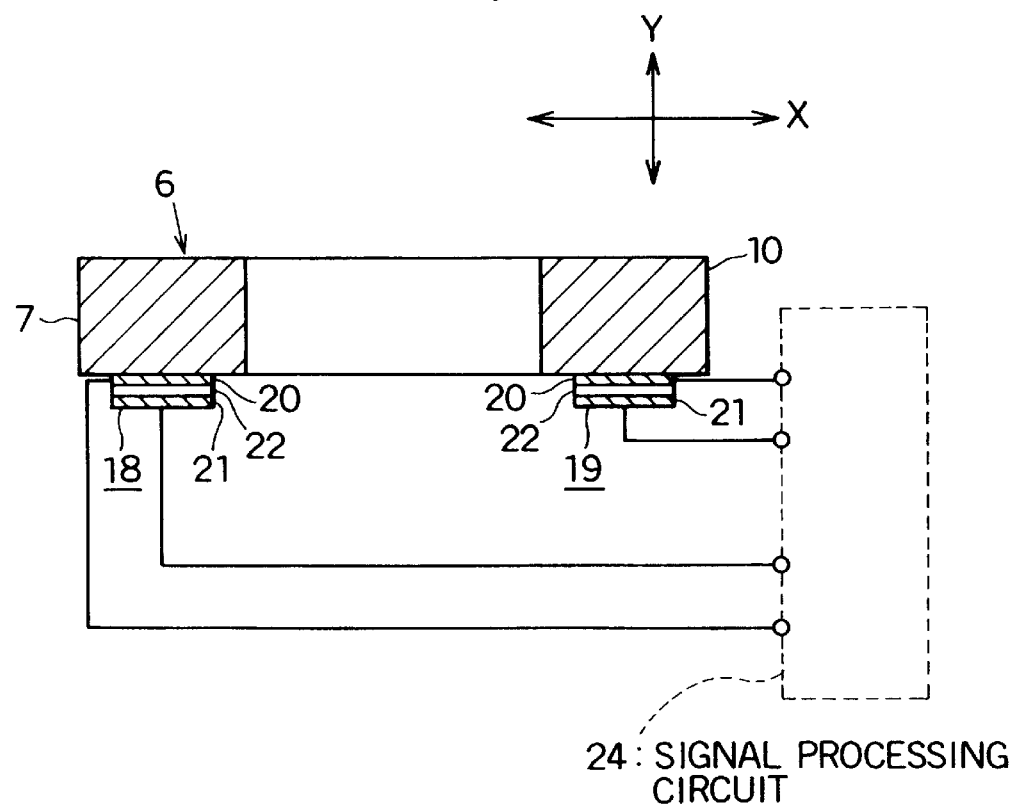
FIG. 3 is a cross sectional view taken along a line 3—3 of FIG. 1.

Here will be detailed these piezoelectric elements 18 and 19. As shown in FIG. 3 presenting a cross sectional view taken along a line 3—3 of FIG. 1, each of the piezoelectric elements 18 and 19 has a laminated structure by sandwiching a piezoelectric material 22 between electrode plates 20 and 21. This lamination is made in the Y direction.

In the present embodiment, the piezoelectric material for the piezoelectric elements 13, 14, 18 and 19 is exemplified by piezoelectric ceramics such as PZT. Moreover, the driving piezoelectric elements 13 and 14 have property in which the driving piezoelectric elements 13 and 14 expand, when fed with a voltage having positive potential with respect to the earth potential, and contract when fed with a voltage having negative potential with respect thereto.

As shown in FIG. 2, the first and second driving piezoelectric elements 13 and 14 are connected with a drive circuit 23 by wiring lines. Specifically, the electrode 16 of the first driving piezoelectric element 13 and the electrode 16 of the second driving piezoelectric element 14 are grounded to the earth potential, and an AC signal (a sine wave) SG1 is outputted to the electrode 15 of the first driving piezoelectric element 13. This drive signal SG1 has the center of its amplitude at the earth potential. To the electrode 15 of the second driving piezoelectric element 14, on the other hand, there is outputted an AC signal (a sine wave) SG2 which has a phase opposed to that of the AC signal SG1. In other words, the drive signal SG2 has the waveform which is inverted from that of the drive signal SG1.

As shown in FIG. 3, the detecting piezoelectric elements 18 and 19 are electrically connected with a signal processing circuit 24 so that the electric signals from the detecting piezoelectric elements 18 and 19 are conveyed to the signal processing circuit 24. Specifically, the individual electrodes 20 and 21 of the detecting piezoelectric elements 18 and 19 are connected with the signal processing circuit 24 by wiring lines so that the displacements of the wide arm portions 7 and 10 of the oscillator 2 in the Y direction are sent as electric signals.

The piezoelectric elements 13, 14, 18 and 19 can be wired by the wire bonder or the like because they are arranged in the common plane.

Here will be described the actions of the angular velocity sensor thus constructed.

Figure 4A:
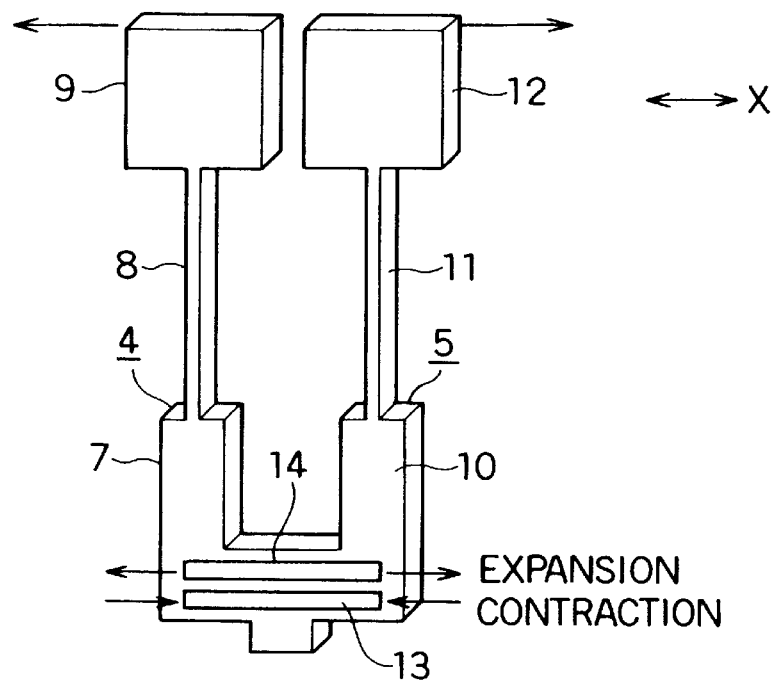
FIGS. 4A and 4B are perspective views of the angular velocity sensor for explaining the operational principle.

The AC signals (i.e., the drive signals) SG1 and SG2 having opposite phases are outputted by the drive circuit 23 of FIG. 2 to the first driving piezoelectric element 13 and the second driving piezoelectric element 14. Then, the first driving piezoelectric element 13 which is located at the lower side of the trunk 6 is contracted, whereas the second driving piezoelectric element 14 at the upper side of the trunk 6 is expanded as shown in FIG. 4A. These actions are caused simultaneously with each other. As a result of the contraction/expansion of the driving piezoelectric elements 13 and 14, the upper ends of the arms 4 and 5 are highly displaced apart from each other in the X direction.

Figure 4B:
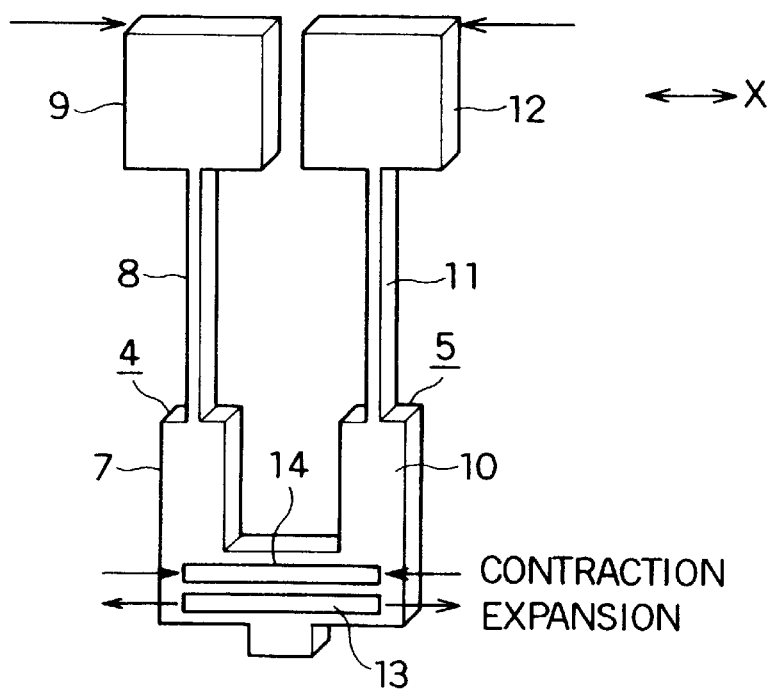

As shown in FIG. 4B, on the other hand, the second driving piezoelectric element 14 at the upper side is contracted, whereas the first driving piezoelectric element 13 at the lower side is expanded. These actions occur simultaneously with each other. As a result of the expansion/contraction of the driving piezoelectric elements 13 and 14, the upper ends of the arms 4 and 5 are highly displaced approaching to each other in the X direction.

These actions of FIGS. 4A and 4B, that is, the expansions/contractions of the first and second driving piezoelectric elements 13 and 14 are repeated to oscillate the arms 4 and 5 in the X direction. These oscillations are driving ones (i.e., exciting actions).

At this time, the drive signals (i.e., the applied voltages) to be outputted to the upper and lower driving piezoelectric elements 14 and 13 are opposite in their phases so that the driving efficient is high.

In the meantime, the oscillator 2 (composed of the arms 4 and 5) includes the narrow arm portions 8 and 11 and the mass portions 9 and 12 so that a difference is made in rigidity between the drive beams (formed from the narrow arm portions 8 and 11 and the mass portions 9 and 12) and the detecting portion (formed from the wide arm portions 7 and 10). As a result, the drive beams (formed from the narrow arm portions 8 and 11 and the mass portions 9 and 12) oscillate largely to the right and left (in the X direction), but no bending stress is applied to the detecting piezoelectric elements 18 and 19.

Generally in the oscillation type angular velocity sensor, if stress is applied to the detecting piezoelectric elements when the sensor is driven to oscillator, noises due to the oscillations generate to deteriorate the S/N ratio. Since the magnitude of the stress to be applied to the detecting elements by the oscillations is proportional to the inverse number of the cube of the width of the arms, the stress will become smaller for the larger width of the arms when the arms are oscillated with an identical leading edge amplitude. Since, on the other hand, this leading edge amplitude is proportional to the inverse number of the cube of the width, as taken in the oscillating direction, of the arms to oscillate, the narrower arms are advantageous for the larger amplitude.

The oscillator 2 of the present embodiment is given such a construction capable of enlarging the leading edge amplitude of the arms 4 and 5 while reducing the transmission of the stress due to the drive oscillations to the detecting piezoelectric elements 18 and 19. That is, the oscillator 2 is shaped such that the arms 4 and 5 are thinned by the narrow arm portions 8 and 11 above the detecting elements 18 and 19.

Figure 5:
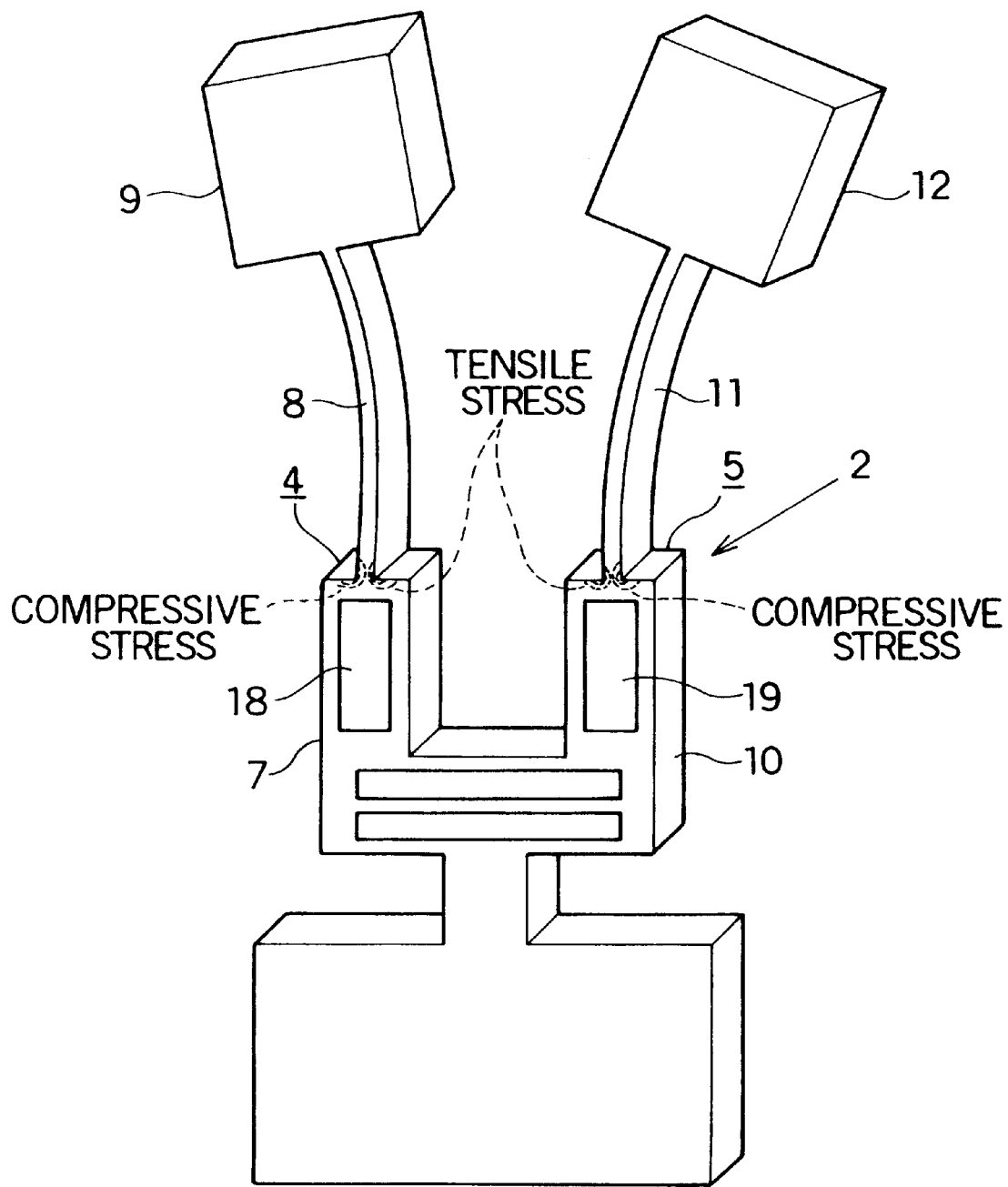
FIG. 5 is a perspective view of the angular velocity sensor for explaining the operational principle.

In this case, as shown in FIG. 5, the bending stress (or strain), as caused by the oscillations of the drive beams, is concentrated as the tensile stress and the compressive stress according to the oscillating direction at the joint portions between the narrow arm portions 8 and 11 and the wide arm portions 7 and 10. As a result, the stress acting on the detecting elements 18 and 19 can be suppressed to improve the S/N ratio.

Further, since the Coriolis force is generated in proportion to the mass of the arms 4 and 5, the sensitivity is improved by positioning the mass portions 9 and 12 at the ends of the narrow arm portions and by making them as heavy (or wide) as possible.

Moreover, the first and second driving piezoelectric elements 13 and 14 are formed only on the surface of the trunk 6 but are not extended to the surfaces of the arms 4 and 5. This makes it possible to prevent the stress from being directly applied from the two piezoelectric elements 13 and 14 to the detecting piezoelectric elements 18 and 19.

During the oscillations of the oscillator 2, when an angular velocity $\Omega$ acts around the center axis L1 of the oscillator 2 as shown in FIG. 1, the Coriolis force (or oscillation component) is generated in the Y direction. This oscillation component is detected by the detecting piezoelectric elements 18 and 19 and sent to the signal processing circuit 24. This signal processing circuit 24 subjects the signal to a differential amplification and outputs it as a signal indicating the magnitude of the angular velocity.

Thus, the angular velocity detection is executed.

Figure 6A:
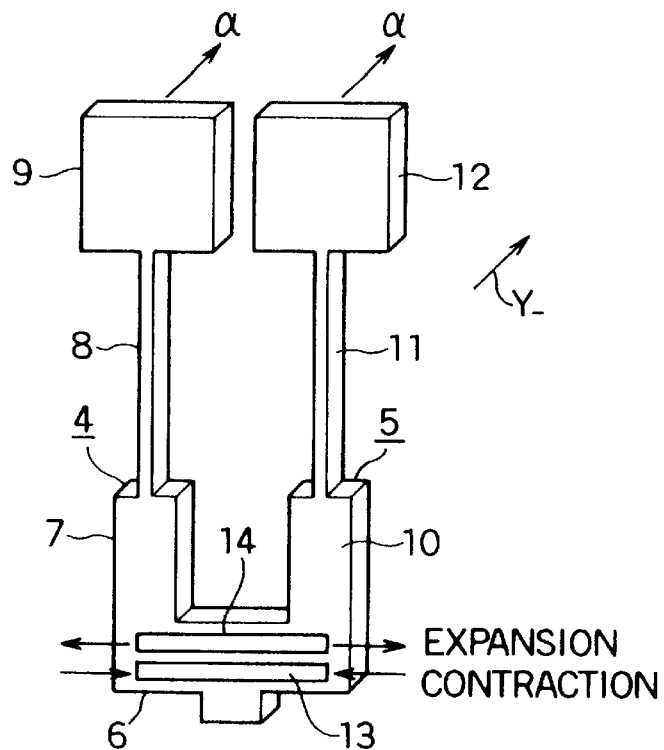
FIGS. 6A and 6B are perspective views of the angular velocity sensor for explaining the operational principle.
Figure 6B:
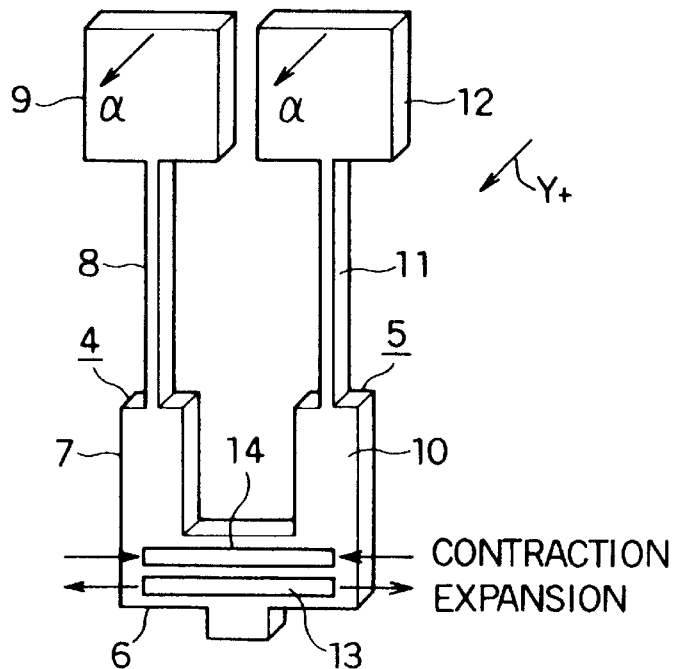

However, because of the structure in which the arms 4 and 5 are oscillated in the X direction by the piezoelectric elements 13 and 14 arranged on the one side surface of the trunk 6, an unnecessary oscillation component $\alpha$ may be generated, as shown in FIGS. 6A and 6B, during the excited oscillations of the oscillator 2 by the expansions/contractions of the driving piezoelectric elements 12 and 13. In more detail, while the arms 4 and 5 of the oscillator 2 are moving apart from each other, as shown in FIG. 6A, the unnecessary oscillation component $\alpha$ in the Y-direction is generated. On the other hand, while the arms 4 and 5 of the oscillator 2 are moving towards each other, as shown in FIG. 6B, the unnecessary oscillation component $\alpha$ in the Y+ direction is generated.

In the present embodiment, the drive voltages to the upper and lower driving piezoelectric elements 14 and 13 are adjusted so as to eliminate the unnecessary oscillation component α. In other words, the drive voltages to the upper and lower driving piezoelectric elements 14 and 13 are not equalized but adjusted to eliminate the unnecessary oscillation component α.

Figure 7:
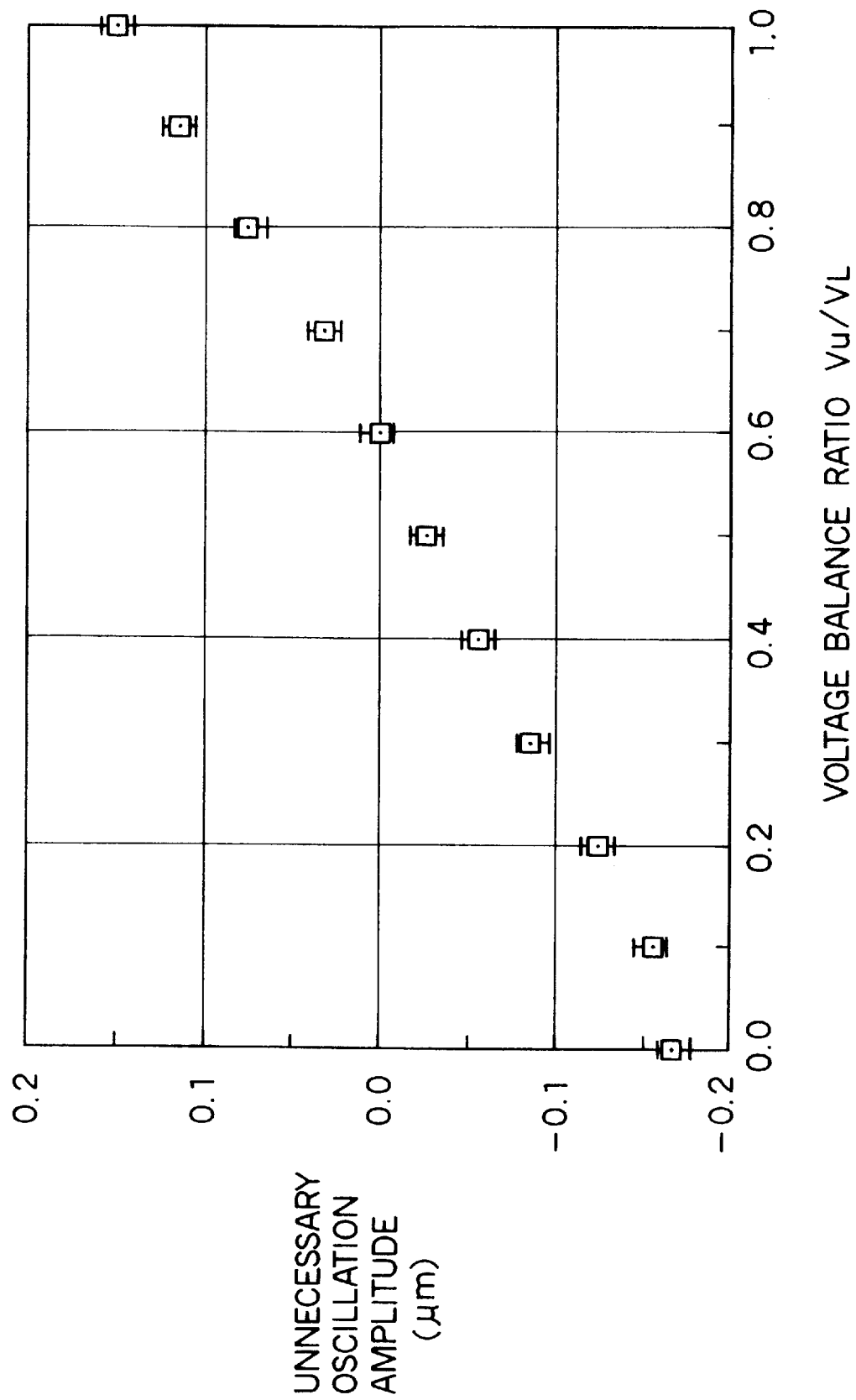
FIG. 7 is a graph plotting a relation between a voltage balance ratio and an unnecessary oscillation amplitude.

FIG. 7 is a graph for determining the drive voltage. In FIG. 7, the abscissa indicates the voltage balance ratio VU/VL between the (maximum) voltage VU to be applied to the second driving piezoelectric element 14 at the upper side and the (maximum) voltage VL to be applied to the first driving piezoelectric element 13 at the lower side, and the ordinate indicates the unnecessary oscillation amplitude. It is found from FIG. 7 that the voltage balance ratio VU/VL= 0.6 is required for reducing the unnecessary oscillation amplitude to "0". In the present embodiment, therefore, the voltage balance ratio VU/VL between the voltage VU applied to the second driving piezoelectric element 14 at the upper side and the voltage VL applied to the first driving piezoelectric element 13 at the lower side is set to "0.6". However, the optimum value of the voltage balance ratio VU/VL between the two maximum voltages varies depending upon the shapes, the materials and the mechanical sizes of the arms 4 and 5 and the trunk 6, upon the shapes and areas of the driving piezoelectric elements 13 and 14 and the like. It is, therefore, necessary to determine the optimum values individually. However, at least the applied voltage VU to the second driving piezoelectric element 14, as positioned closer to the arms 4 and 5, is made smaller than the applied voltage VL to the first driving piezoelectric element 13.

Thus, in the present embodiment, the trunk 6 is equipped with the driving piezoelectric elements 13 and 14 which are extended in the driven oscillating direction (i.e., the X direction) and of which the electrode plates 15, 16 and the piezoelectric material 17 are laminated in the detected oscillating direction (i.e., the Y direction), and the arms 4 and 5 (or the wide arm portions 7 and 10, more specifically) are equipped with the detecting piezoelectric elements 18 and 19 of which the electrode plates 15, 16 and the piezoelectric material 17 are laminated in the detected oscillating direction (i.e., the Y direction). As a result, the individual piezoelectric elements 13, 14, 18 and 19 are arranged in the common plane and can be adhered and wired from one face so that they can be easily mounted and manufactured by the simple manufacturing process. This makes it possible to manufacture the sensor at a low cost.

Moreover, the first and second driving piezoelectric elements 13 and 14 are arranged with a gap therebetween in the extending direction (i.e., the Z direction) of the arms 4 and 5, and the AC signals in the opposite phases are applied to those first and second driving piezoelectric elements 13 and 14. Therefore, when one of the first and second driving piezoelectric elements 13 and 14 is to be driven so as to expand, the other is driven so as to contract. As a result, the driving efficiency can be improved.

Figure 19:
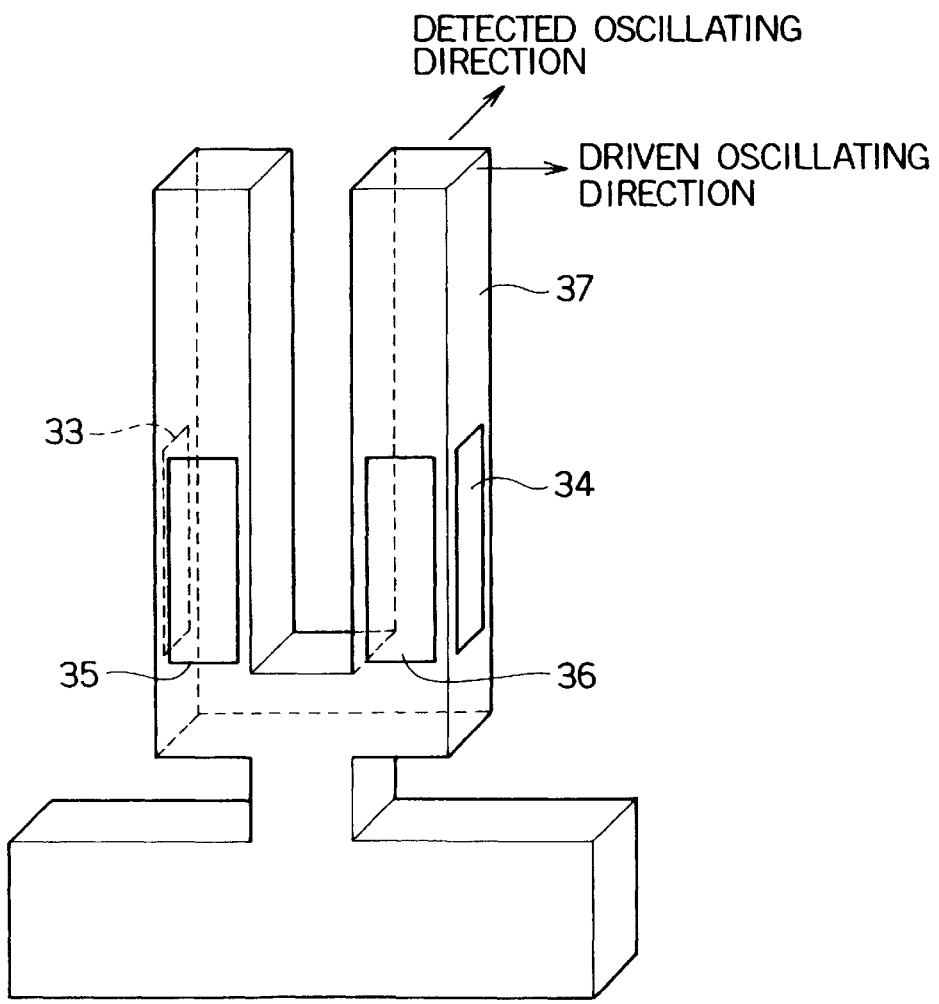
FIG. 19 is a perspective view of an angular velocity sensor of the prior art.

In the angular velocity sensor having the construction of the prior art, as shown in FIG. 19, if the manufacturing steps (e.g., the adhering and wiring steps) are attempted to be simplified by arranging the driving piezoelectric elements 33 and 34 and the detecting piezoelectric elements 35 and 36 on the same plane, the efficiency of either the driving or detecting side is lowered, whereby a sensor having a high S/N ratio cannot be achieved. In the present embodiment, on the contrary, it is possible to provide a sensor which can be easily manufactured while suppressing the drop in the performance by driving the first and second driving piezoelectric elements 13 and 14 with the voltages in the opposite phases.

By adjusting the voltage balance ratio VU/VL of the drive voltages to the driving piezoelectric elements 13 and 14, i.e., the voltages to be applied to the driving piezoelectric elements 13 and 14, the unnecessary oscillation α in the detected oscillating direction (the Y direction) is suppressed. As a result, the offset adjustment can be easily performed to improve the S/N ratio.

In a modification of the present embodiment, the unnecessary oscillation α in the detected oscillating direction may be suppressed not by adjusting the (maximum) voltages to be applied to the driving piezoelectric elements 13 and 14 but by adjusting the areas of the driving piezoelectric elements 13 and 14 while leaving the applied voltages of the driving piezoelectric elements 13 and 14 equal. In this modification, the relative enlargement of the area of the piezoelectric element has an effect similar to that of the relative rise in the applied voltage. In order to keep the magnitudes of the oscillations of the arms 4 and 5, however, it is important to retain the length of the piezoelectric elements 13 and 14 in the X direction. Therefore, the adjustment of the areas is preferably performed by changing the widths of the piezoelectric elements 13 and 14 in the Z direction. On the other hand, it is naturally possible to adjust both the voltages applied to the piezoelectric elements 13 and 14 and the areas thereof.

Second Embodiment

A second embodiment will be described by stressing the differences from the first embodiment.

Figure 8:
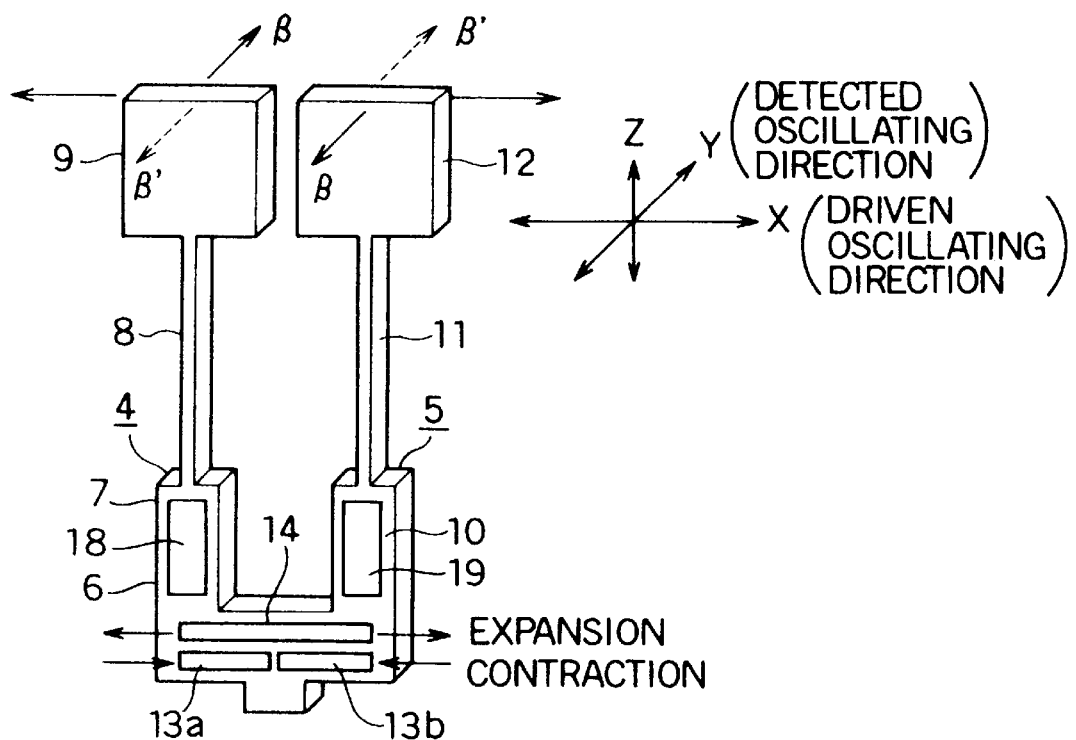
FIG. 8 is a perspective view of an angular velocity sensor according to a second embodiment.

An angular velocity sensor of the present embodiment is shown in FIG. 8. In this embodiment, the first driving piezoelectric element 13 at the lower side in the first embodiment is horizontally halved into two driving piezoelectric elements 13a and 13b. Here, the driving piezoelectric element 13a is given an area equal to that of the driving piezoelectric element 13b.

Figure 9:
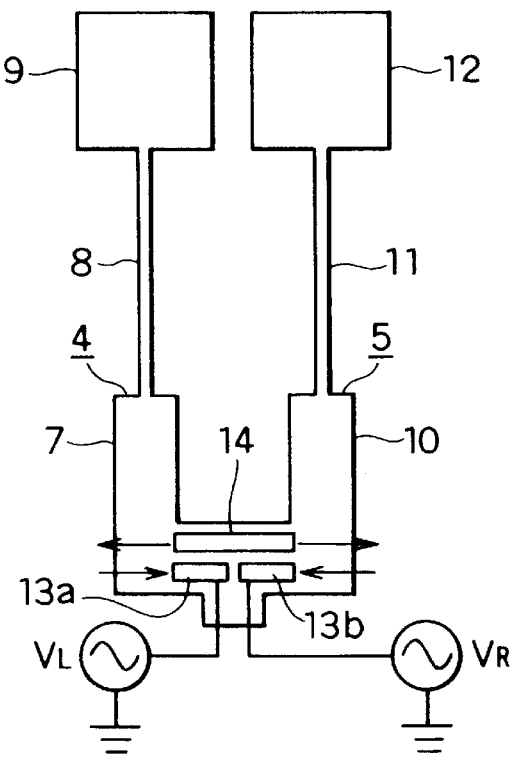
FIG. 9 is a front elevation for explaining the operational principle.

In the first embodiment, the oscillator 2 may lose its oscillating balance by the processing dimensional tolerances or the errors of the mounting positions of the driving piezoelectric elements. That is, the oscillator 2 may fail to oscillate symmetrically. Specifically, when the driving piezoelectric elements 13a, 13b and 14 are contracted/expanded as shown in FIG. 8, unnecessary oscillation components β and β' are generated in the detected oscillating direction (the Y direction). These unnecessary oscillation components β and β' are generated in the opposite directions in the left and right arms 4 and 5. As shown in FIG. 9, therefore, the (maximum) applied voltages VR and VL to be applied to the driving piezoelectric elements 13a an 13b, as halved, are adjusted. Specifically, when the unnecessary oscillation component β appears in the direction, as shown in FIG. 8, it is sufficient that the (maximum) voltage VL to be applied to the driving piezoelectric element 13a is relatively higher than the (maximum) voltage VR to be applied to the piezoelectric element 13b. By thus adjusting the levels of the applied voltages VR and VL, the unnecessary oscillations β and β' which are generated in the opposite directions in the left and right arms 4 and 5 are suppressed and, therefore, the horizontal balance can be ensured to effect the symmetric oscillations.

Thus, in the present embodiment, the plurality of driving piezoelectric elements 13a and 13b are provided in the driven oscillating direction (i.e., the X direction), and the voltages to be applied to the driving piezoelectric elements 13a and 13b are adjusted so that the unnecessary oscillations β and β' can be suppressed.

In a modification of the present embodiment, the unnecessary oscillations β and β' may be suppressed not by adjusting the applied voltages of the driving piezoelectric elements 13a and 13b but by making different the areas of the driving piezoelectric elements 13a an 13b while leaving the applied voltages of the driving piezoelectric elements 13a and 13b equal. In short, in order to suppress the unnecessary oscillations β and β' shown in FIG. 8, it is sufficient to make the area of the piezoelectric element 13a larger than that of the piezoelectric element 13b.

Third Embodiment

A third embodiment will be described by stressing the differences from the first embodiment.

Figure 10:
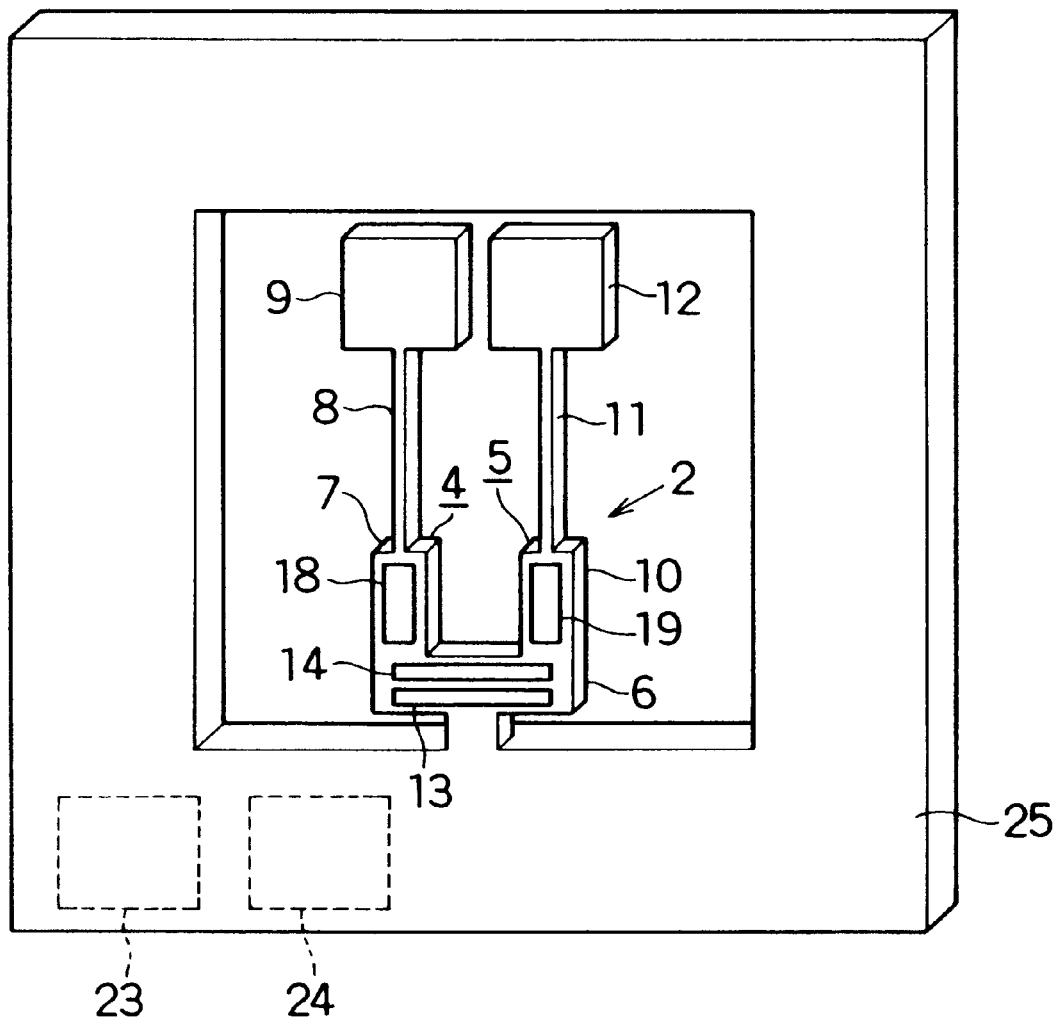
FIG. 10 is a perspective view of an angular velocity sensor according to a third embodiment.

An angular velocity sensor of this embodiment is shown in FIG. 10. In this embodiment, the angular velocity sensor is exemplified by a semiconductor angular velocity sensor which is made of a piezoelectric thin film by using the semiconductor micro-machine technique.

In FIG. 10, a predetermined region in a silicon substrate 25 having a predetermined thickness is etched off to form the oscillator 2. A thin film electrode material, a thin film piezoelectric material and a thin film electrode material are sequentially laminated in the predetermined region of the silicon substrate 25 to form the piezoelectric elements 13, 14, 18 and 19.

More specifically, the silicon substrate 25 having a predetermined thickness is prepared for manufacturing the sensor, and the predetermined region of the silicon substrate 25 is etched off by the photolithography technique to form the oscillator 2. Moreover, the thin film electrode material, the thin film piezoelectric material and the thin film electrode material are sequentially filmed and patterned in a desired shape to form the piezoelectric elements 13, 14, 18 and 19. Here, the thin film piezoelectric material is exemplified by ZnO or the like and is film-formed by the sputtering method.

The drive circuit 23 and the signal processing circuit 24 are integrally formed on the silicon substrate 25 by the semiconductor manufacturing technique and thereby formed into one chip. These drive circuit 23 and signal processing circuit 24 are electrically connected to the piezoelectric elements 13, 14, 18 and 19 with a conductive metal film of aluminum or the like.

In the present embodiment, the variation of the temperature characteristics and the reduction of the Q value, as may be caused by the adhesive layer in the foregoing individual embodiments, can be avoided by film-forming the piezoelectric elements directly on the silicon oscillator. As a result, it is possible to construct a more accurate sensor.

Thus, the sensors can be manufactured in excellent mass productivity by using the micro-machine technique of the silicon substrate.

The present invention may be practiced in other modes, as follows.

Figure 11:
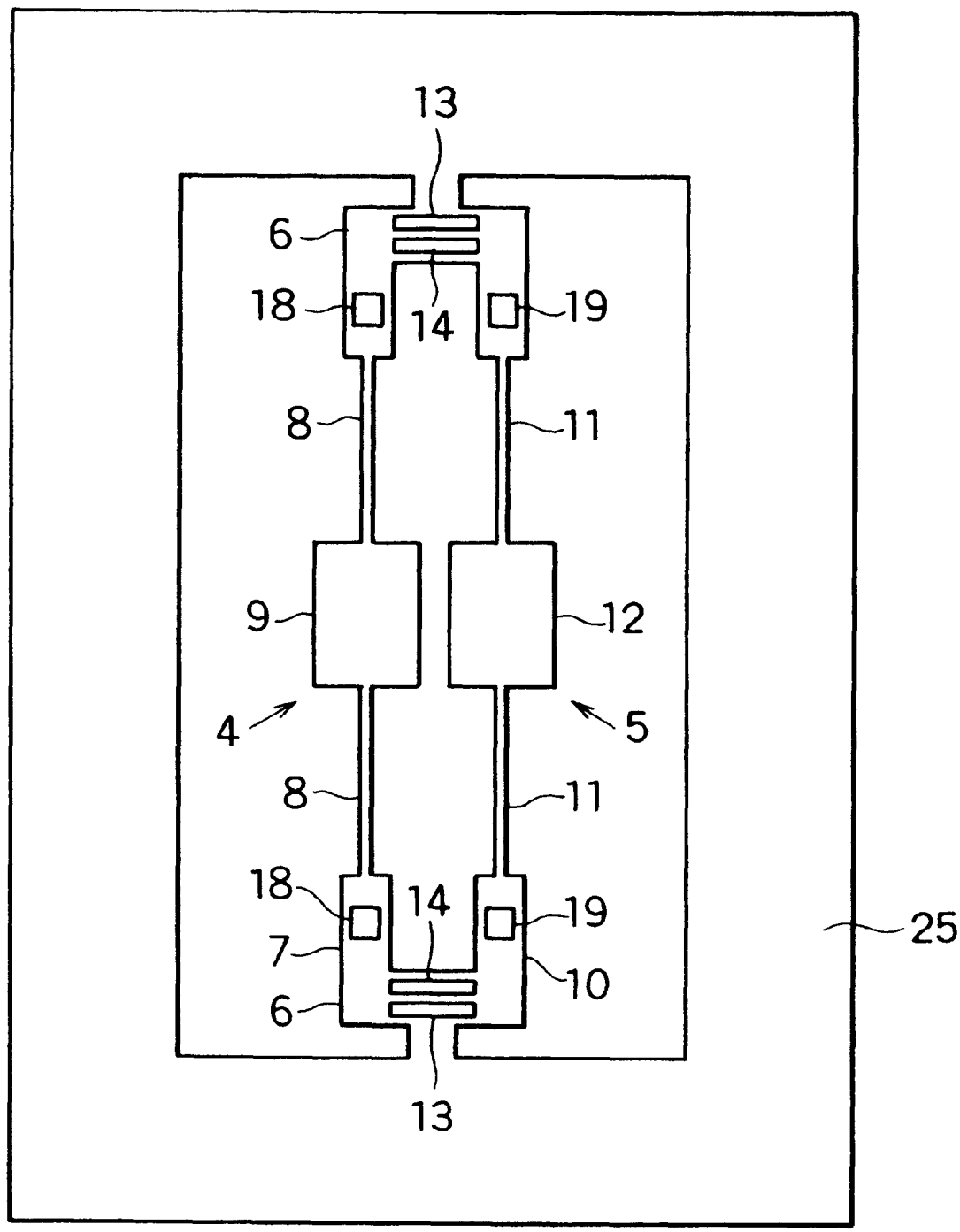
FIG. 11 is a front elevation of an angular velocity sensor of another example.

(1) The tuning-fork oscillator is the cantilever type in the foregoing individual embodiments but may be a twin type, as shown in FIG. 11.

Figure 12:
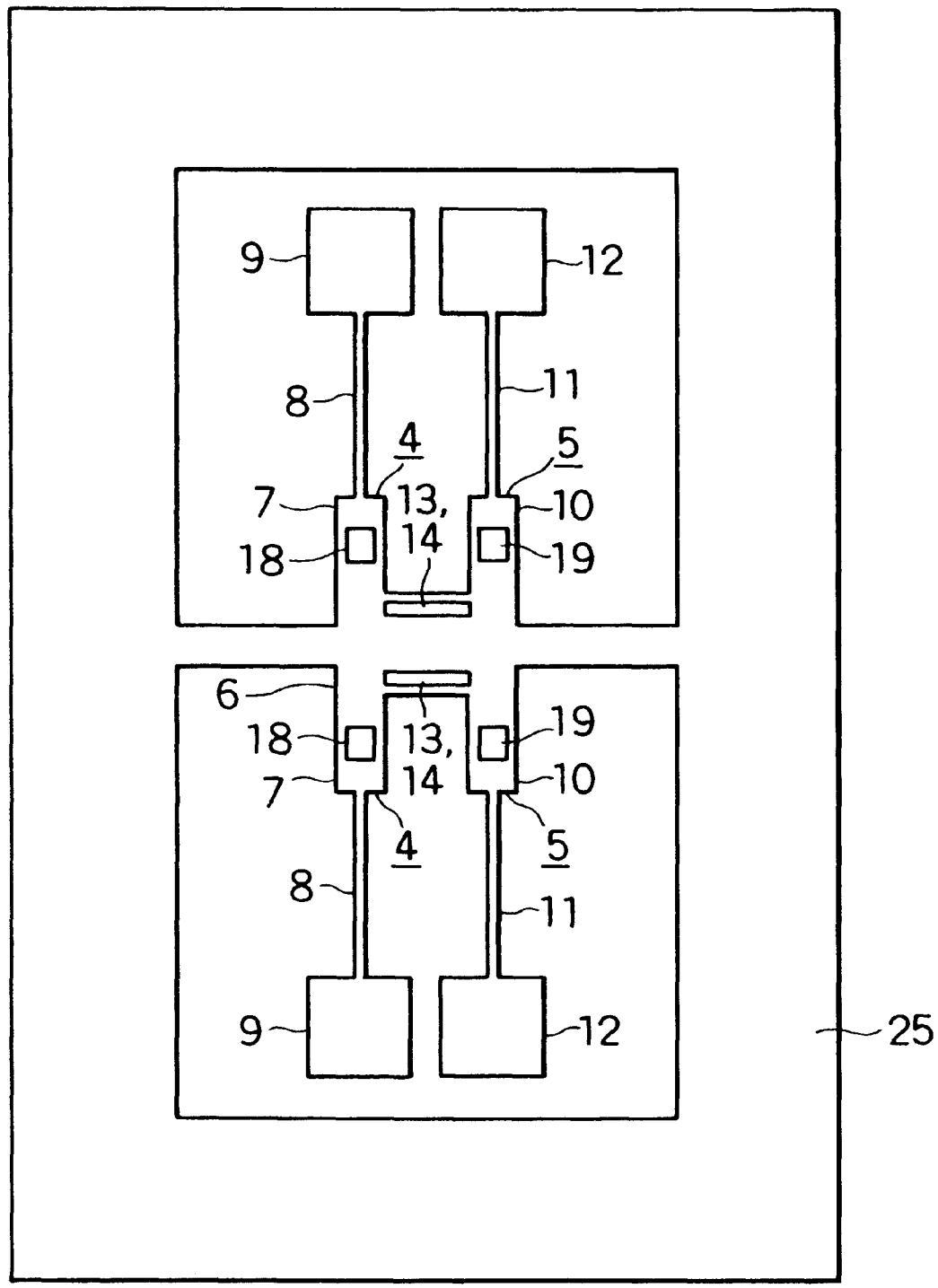
FIG. 12 is a front elevation of an angular velocity sensor of another example.

(2) Alternatively, the present invention may be applied to an H-shaped tuning-fork oscillator, as shown in FIG. 12 or 13.

Figure 14:
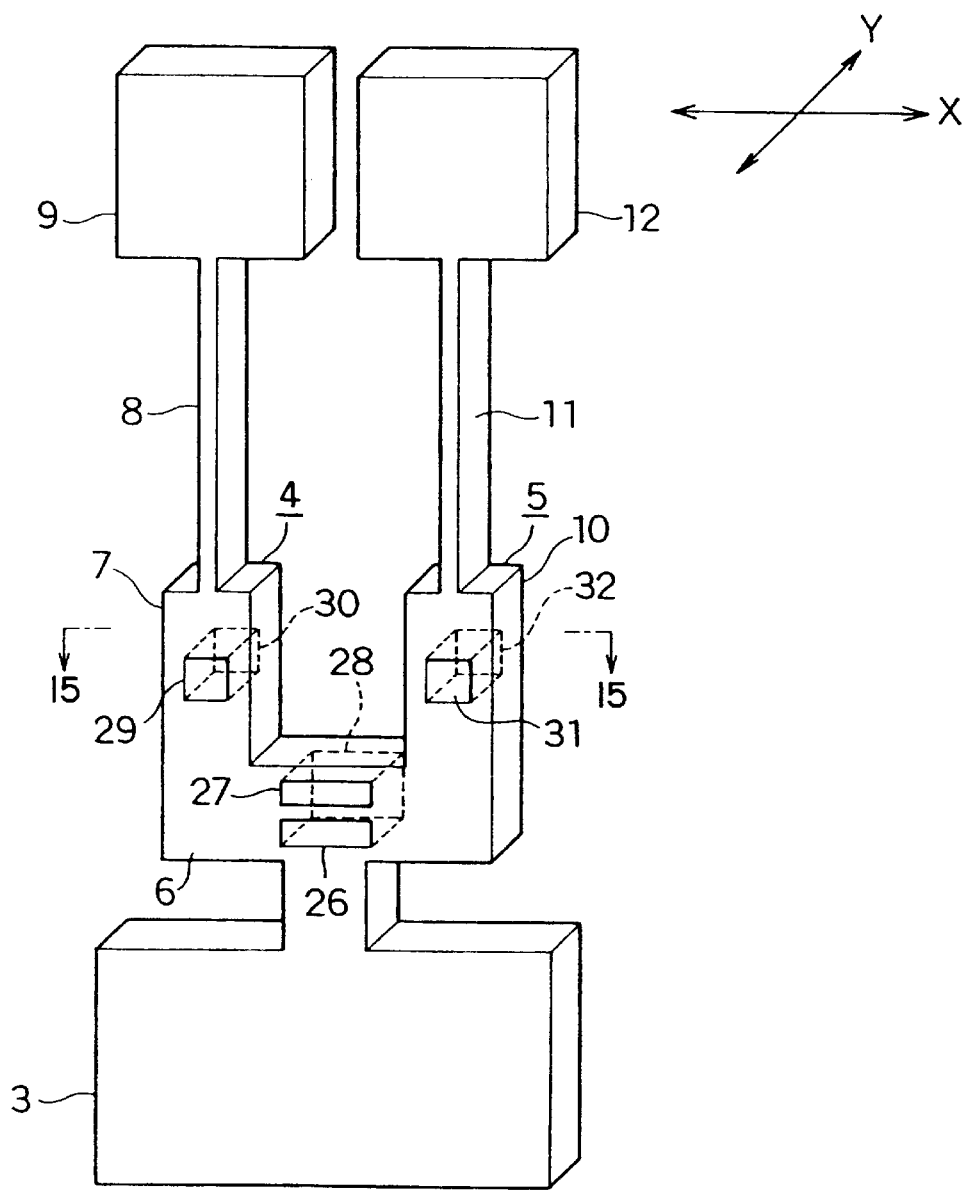
FIG. 14 is a front elevation of an angular velocity sensor of another example.
Figure 15:
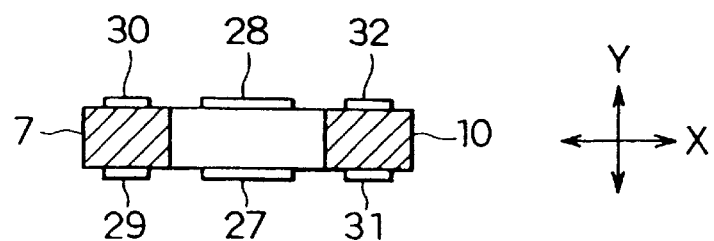
FIG. 15 is a cross sectional view taken along a line 15—15 of FIG. 14.

(3) As shown in FIGS. 14 and 15 (presenting a cross sectional view taken along a line 15—15 of FIG. 14), the oscillator may be made of a piezoelectric material and given a structure in which piezoelectric element electrodes are adhered to the front and back surfaces of the oscillator. More specifically, the oscillator includes: front surface electrode plates 26 and 27 for making a driving piezoelectric elements; a back surface electrode plate (or a common electrode plate) 28 for making the driving piezoelectric elements along with the front surface electrode plates 26 and 27; a front surface electrode plate 29 for making a detecting piezoelectric element; a back surface electrode plate 30 confronting the electrode plate 29 to make the detecting piezoelectric element along with the front surface electrode plate 29; a front surface electrode plate 31 for making a detecting piezoelectric element; and a back surface electrode plate 32 confronting the electrode plate 31 to make the detecting piezoelectric element along with the front surface electrode plate 31.

In this case as well, the piezoelectric element is given a structure laminated in the Y direction.

In the present construction, the oscillator made of a piezoelectric is sandwiched between the electrode materials to make the piezoelectric elements, so that the piezoelectric elements can be made integral with the oscillator.

(4) In the foregoing individual embodiments, the oscillator is equipped with the narrow arm portions 8 and 11 and the mass portions 9 and 12. However, the narrow arm portions 8 and 11 and the mass portions 9 and 12 may be eliminated to provide an arm structure extending linearly with a constant width.

(5) The oscillator 2 is given a structure having the paired lower and upper driving piezoelectric elements 13 and 14, but may be driven to oscillate (or excited) by only one driving piezoelectric element.

(6) The driving piezoelectric elements 13 and 14 are arranged in the horizontal portion 6b of the trunk 6 in the foregoing individual embodiments, but may be arranged in the vertical portion 6a of the trunk 6.

(7) The piezoelectric elements should not be limited to one having the laminated structure but may have another structure.

Fourth Embodiment

A fourth embodiment of the present invention will be described in detail with reference to the accompanying drawings. As shown in FIG. 16B, a semiconductor substrate 101 such as a silicon substrate having a predetermined thickness is etched at its predetermined region by the photolithography technique to form a turning-fork type semiconductor oscillator 102 at the central portion of the substrate 101.

The semiconductor oscillator 102 is constructed to include: a support 121 jointed to the body of the frame-shaped substrate 101 therearound; and a recessed trunk 122 leading from the support 121. From the left and right upper end faces of the trunk 122, respectively, there are extended slender pillars 123 and 124 upward of the drawing. These pillars 123 and 124 are equipped with wide mass portions 125 and 126 at their leading edges.

The trunk 122 is formed with a pair of left and right driving piezoelectric elements 131 and 132 on its lower surface. Below these driving piezoelectric elements 131 and 132, moreover, there are formed a pair of left and right piezoelectric elements 133 and 134. These piezoelectric elements 131, 132, 133 and 134 function as an oscillation exciting unit for exciting the oscillations of the oscillator 102 and are formed by film-forming a thin film piezoelectric material such as ZnO or PZT by the sputtering method or the vapor evaporation and by patterning it into a desired shape. On the upper faces of the piezoelectric elements, there are formed upper electrodes 141, 142, 143 and 144 of a thin film electrode material.

Further, on the surface of the trunk 122 of the oscillator 102, there are sequentially laminated a feedback element 105 of the thin film piezoelectric material such as ZnO or PZT and its upper electrode 151. On the upper left and right surfaces of the trunk 122 (corresponding to the arms in the forgoing embodiments), moreover, there are sequentially laminated detecting piezoelectric elements 161 and 162 of the thin film piezoelectric material such as ZnO or PZT and their upper electrodes 171 and 172. These feedback element 105 and detecting piezoelectric elements 161 and 162 function as the oscillation detecting unit.

With the upper electrodes 141, 142, 143, 144, 151, 171 and 172 of those individual elements, respectively, there connected wiring lines 181, 182, 183, 184, 185, 186 and 187 of a thin film conductive material such as aluminum, so that signals can be fed to or extracted from the individual electrodes.

All of these upper electrodes 141, 142, 143, 144, 151, 171 and 172 and wiring lines 181, 182, 183, 184, 185, 186 and 187 can be formed by the aforementioned thin film forming technique. On the other hand, the lower electrodes of those individual elements are commonly exemplified by grounding the oscillator 102 to the earth.

Figure 16A:
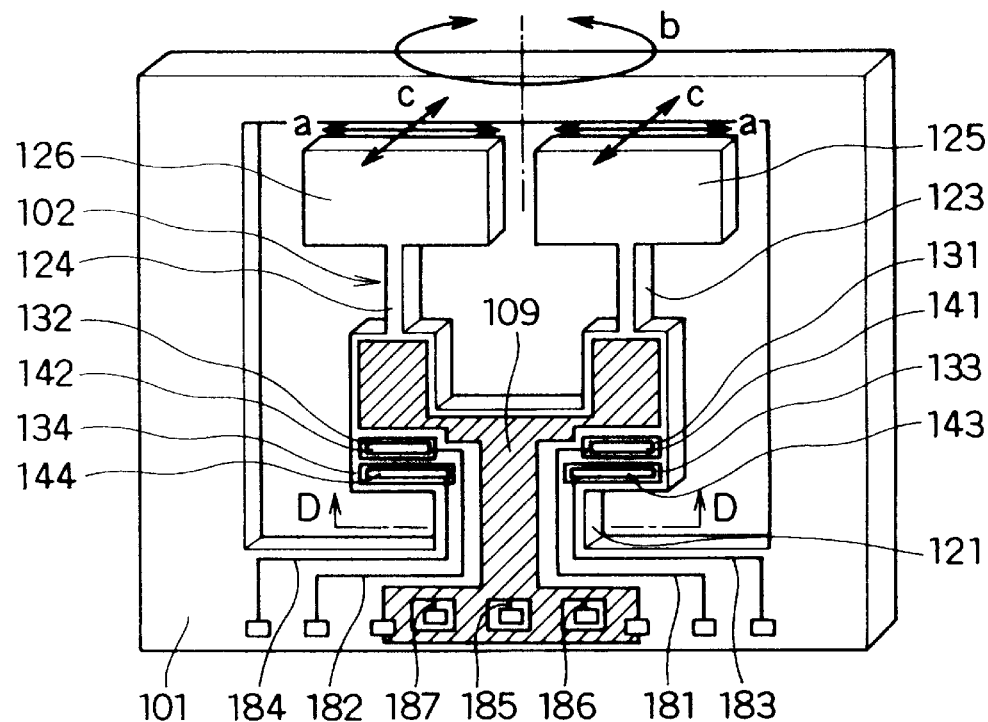
FIG. 16A is a front elevation of an angular velocity sensor according to a fourth embodiment of the present invention.
Figure 16B:
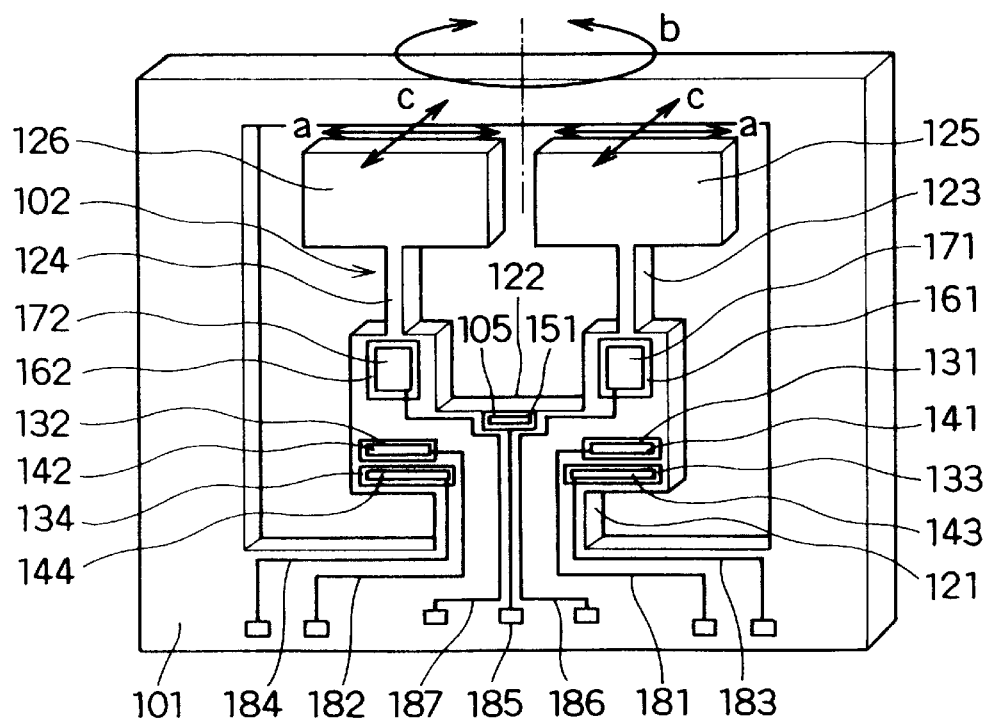
FIG. 16B is a front elevation showing a construction in which a shield film is removed from the construction of FIG. 16A.

In the present invention, the feedback element 105 and its wiring line 185, and the detecting piezoelectric elements 161 and 162 and their wiring lines 186 and 187 are shielded from the driving piezoelectric elements 131, 132, 133 and 134 and their wiring lines 181, 182, 183 and 184 by covering them with a shield film 109 (as shown in FIG. 16A) made by using the aforementioned thin film forming technique.

Alternatively, or in addition, a similar shield film can cover the oscillating exciting unit including driving piezoelectric elements 131, 132, 133 and 134, and their wiring lines 181, 182, 183 and 184.

Figure 17:
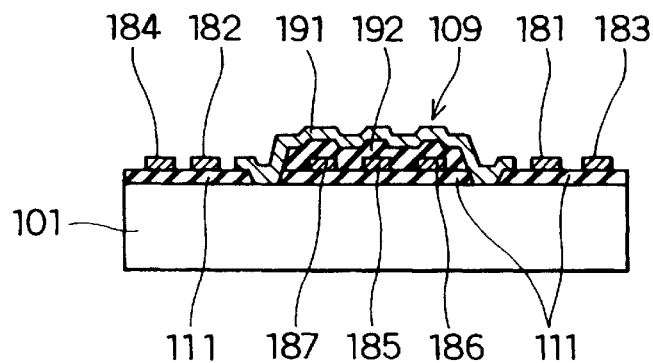
FIG. 17 is a cross sectional view taken along a line D—D of FIG. 16A.

As shown in FIG. 17, the shield film 109 covers the upper faces and side faces of the aforementioned individual elements and wiring lines with a conductive film 191 through an insulating film 192 such that the lower side edges of the conductive film 191 reaches the surface of the substrate 101. On the surface of this substrate 101 to be electrically wired, there is formed an insulating film 111 for insulating the oscillator 102 and the individual wiring lines, as shown in FIG. 17. The lower side edges of the conductive film 191 make contact through the insulating film 111 with the surface of the underlying substrate 101.

With the construction described above, signals V+ in phase are applied to the paired driving piezoelectric elements 131 and 132 through the wiring lines 181 and 182, and signals V− having a phase difference of 180 degrees from the signals V+ are applied to the paired driving piezoelectric elements 133 and 134 through the wiring lines 183 and 184. Then, when the driving piezoelectric elements 131 and 132 are expanded, the other driving piezoelectric elements 133 and 134 are contracted so that the trunk 122 is bent. By using the AC signals V+ and V−, the pillars 123 and 124 and the mass portions 125 and 126 of the oscillator 102 are oscillated and bent in the direction of arrow "a" in the same manner as the first embodiment. The stress resulting from these bending oscillations is applied to the feedback element 105 to generate signals, which are fed back so that a resonance can be made in the direction of arrow "a" to establish a large amplitude. When an angular velocity is then applied in the direction of arrow b, the Coriolis force is generated in the direction of arrow c at the mass portions 125 and 126. A bending force according to the Coriolis force is applied to the detecting piezoelectric elements 161 and 162 to generate a voltage so that the angular velocity can be detected by detecting the voltage signal from the detecting piezoelectric elements 161 and 162.

Here, in the state without the shield film 109, as shown in FIG. 16B, the wiring lines 181 to 187 are close to one another in the support 121, so that the drive signals, as applied to the wiring lines 181, 182, 183 and 184 for the driving elements, may possibly flow around the wiring lines 185, 186 and 187 of the feedback element 105 or the detecting elements 161 and 162 by the induction or the electrostatic capacity coupling. In order to prevent this, according to the present embodiment, the surfaces of the feedback element, the detecting elements and their wiring lines 185, 186 and 187 are covered with the shield film 109, as shown in FIG. 16A. This shield film 109 is electrically connected with the semiconductor substrate 101 such as a silicon substrate, as shown in FIG. 17. As a result, the feedback element, the detecting elements and their wiring lines can be shielded from the signals coming from the wiring lines 181, 182, 183 and 184 for the driving elements.

The angular velocity sensor having the construction thus far described was actually prepared and tested to confirm the effects of the present embodiment. As a result, when the drive voltage of 1 Vrms is applied to the driving elements in the construction having no shield film, as shown in FIG. 16B, the flow-around of the signal was 10 mV or higher. In the construction having the shield film, as shown in FIG. 16A, on the other hand, the signal flow-around was drastically reduced to 5 micro V or less.

Figure 18A:
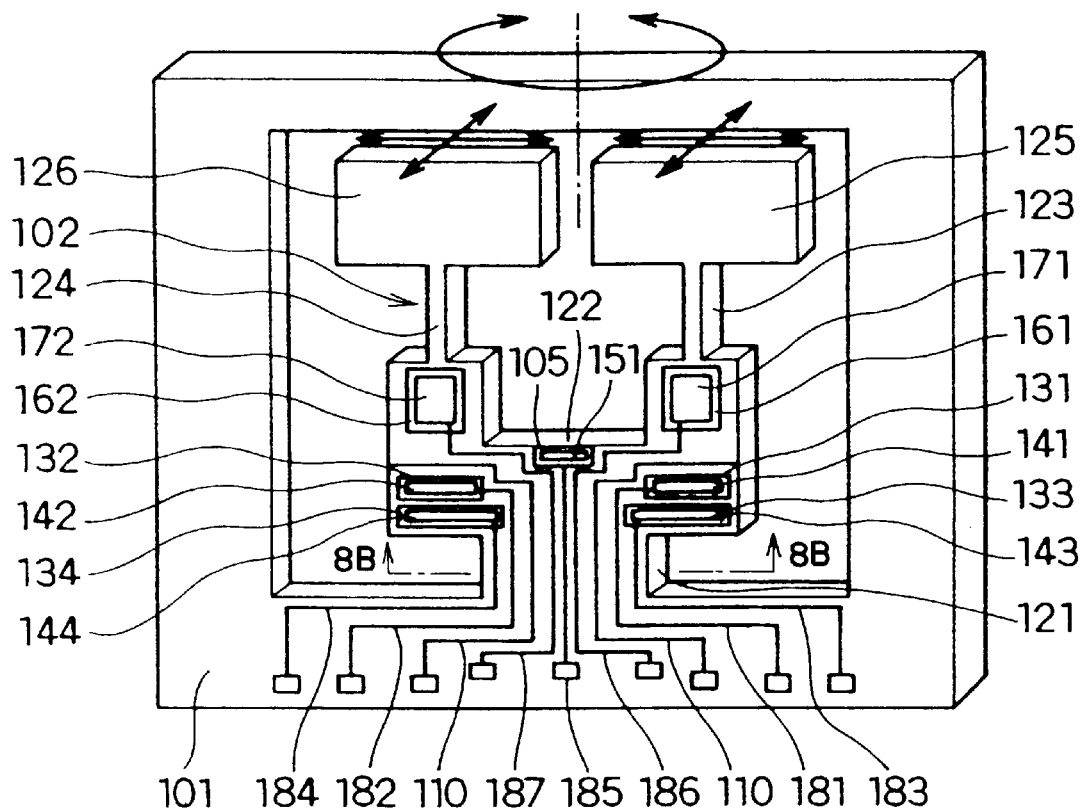
FIG. 18A is a front elevation of an angular velocity sensor as a comparative example.
Figure 18B:
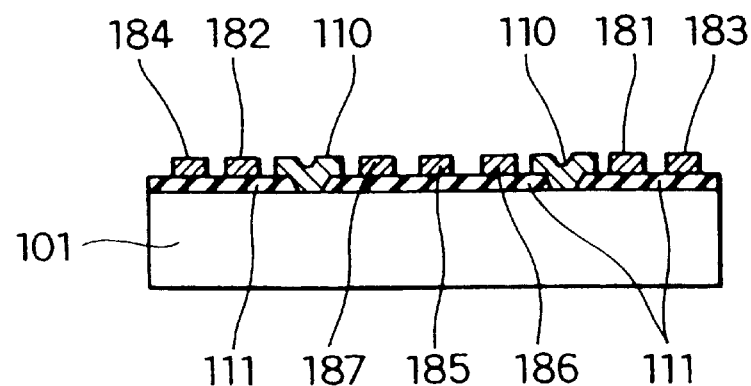
FIG. 18B is a cross sectional view taken along a line 18A—18A of FIG. 18A.

For comparison, a shield similar to that according to the method, as disclosed in Japanese Patent Application Laid-Open No. 3-131713, was applied to the small-sized angular velocity sensor which had an oscillator by etching the silicon substrate, and its effect was examined. In the angular velocity sensor having a fundamental construction similar to that of FIGS. 16A and 16B, as shown in FIGS. 18A and 18B, one group of the driving piezoelectric elements 131, 132, 133 and 134 and their wiring lines 181, 182, 183 and 184, and the other group of the detecting piezoelectric elements 161 and 162, the feedback element 105 and their wiring lines 185, 186 and 187 were isolated by a shield wiring line 110 made of a conductive film, and the lower end of the shield wiring line 110 was connected to the surface of the substrate 101. Since the oscillator 102 was grounded to the earth, the detecting and feedback wiring lines 185, 186 and 187 were shielded from the driving wiring lines 181, 182, 183 and 184.

According to this construction, however, the portion having the strongest electric field is shielded, but the peripheries of the wiring lines are not completely covered. As a result, the field, as might otherwise flow around the upper space of the wiring lines in FIGS. 18A and 18B, cannot be shielded so that the noises cannot be completely eliminated. The angular velocity sensor having the aforementioned structure was actually prepared and subjected to tests similar to the aforementioned ones. These tests have revealed that the flow-around of the signals cannot be reduced to about 1 mV. Thus, it is found that a far more excellent shield effect than that of the comparative example can be achieved by the structure of the present embodiment.

In the aforementioned embodiment, not only the wiring lines but also the surfaces of the detecting piezoelectric elements and the feedback element are covered with the shield film 109, but a sufficient effect can be expected even if only the wiring lines neighboring to each other over the support 121 is covered with the shield film. A similar effect can be achieved even if not the wiring lines for the detecting piezoelectric elements and the feedback element but the wiring lines for the driving piezoelectric elements are covered with the shield film. Moreover, the shape of the oscillator should not be limited to the cantilever tuning-fork type but may be exemplified by another shape such as the twin tuning-fork type as described earlier.

When the unnecessary oscillation components α and β are generated in the fourth embodiment, they can naturally be suppressed by adjusting the applied voltage and/or the areas of the driving piezoelectric elements 131, 132, 133 and 134.

What is claimed is:

1. An angular velocity sensor comprising:

a tuning-fork oscillator having arms extending in parallel to each other and joined to a stationary body through a trunk, said arms and said trunk having respective surfaces substantially coplanar to each other;

first and second driving piezoelectric elements arranged only on said respective surface of said trunk with a gap therebetween, said gap having a width extending in a direction of said arms; and angular velocity detecting piezoelectric elements arranged on said surfaces of said arms, wherein said first and second driving piezoelectric elements generate forces for giving said arms predetermined oscillations so that said arms may oscillate on a plane in parallel with said surface on which said angular velocity detecting piezoelectric elements are arranged, and wherein said first driving piezoelectric element and said second driving piezoelectric element are adjusted in their applied voltages so as to suppress an unnecessary oscillation which is generated in a detected oscillating direction perpendicular to said plane on which said arms oscillate.

2. An angular velocity sensor comprising:

a tuning-fork oscillator having arms extending in parallel to each other and joined to a stationary body through a trunk, said arms and said trunk having respective surfaces substantially coplanar to each other;

first and second driving piezoelectric elements arranged only on said respective surface of said trunk with a gap therebetween, said gap having a width extending in a direction of said arms; and angular velocity detecting piezoelectric elements arranged on said surfaces of said arms, wherein said first and second driving piezoelectric elements generate forces for giving said arms predetermined oscillations so that said arms may oscillate on a plane in parallel with said surface on which said angular velocity detecting piezoelectric elements are arranged, and wherein said first driving piezoelectric element and said second driving piezoelectric element are adjusted in their areas so as to suppress an unnecessary oscillation which is generated in a detected oscillating direction perpendicular to said plane on which said arms oscillate.

3. An angular velocity sensor comprising:

a tuning-fork oscillator having arms extending in parallel to each other and joined to a stationary body through a trunk, said arms and said trunk having respective surfaces substantially coplanar to each other;

first and second driving piezoelectric elements arranged only on said respective surface of said trunk with a gap therebetween, said gap having a width extending in a direction of said arms; and angular velocity detecting piezoelectric elements arranged on said surfaces of said arms, wherein said first and second driving piezoelectric elements generate forces for giving said arms predetermined oscillations so that said arms may oscillate on a plane in parallel with said surface on which said angular velocity detecting piezoelectric elements are arranged, and wherein there is a plurality of at least said first driving piezoelectric elements along an oscillating direction of said arms, and each of said first driving piezoelectric elements is adjusted in its applied voltage so as to suppress an unnecessary oscillation which is generated in a detected oscillating direction perpendicular to said oscillating direction.

4. An angular velocity sensor comprising:

a tuning-fork oscillator having arms extending in parallel to each other and joined to a stationary body through a trunk, said arms and said trunk having respective surfaces substantially coplanar to each other;

first and second driving piezoelectric elements arranged only on said respective surface of said trunk with a gap therebetween, said gap having a width extending in a direction of said arms; and angular velocity detecting piezoelectric elements arranged on said surfaces of said arms, wherein said first and second driving piezoelectric elements generate forces for giving said arms predetermined oscillations so that said arms may oscillate on a plane in parallel with said surface on which said angular velocity detecting piezoelectric elements are arranged, and wherein there is a plurality of at least said first driving piezoelectric elements along an oscillating direction of said arms, and each of said first driving piezoelectric elements is adjusted in its area so as to suppress an unnecessary oscillation which is generated in a detected oscillating direction perpendicular to said oscillating direction of said arms.

5. An angular velocity sensor comprising:

a tuning-fork oscillator having arms extending in parallel to each other and joined to a stationary body through a trunk;

first and second driving piezoelectric elements having a plural-layer laminated structure and arranged only on said trunk with a gap therebetween, said gap having a width extending in a direction of said arms for driving and oscillator to oscillate in a driven oscillating direction; and detecting piezoelectric elements having a plural-layer laminated structure and arranged on said arms for detecting oscillations of said oscillator in a detected oscillating direction perpendicular to said driven oscillating direction, wherein said plural layers of each of said first and second driving piezoelectric elements are laminated along said detected oscillating direction and are elongated along said driven oscillating direction, and said plural layers of said detecting piezoelectric elements are laminated along said detected oscillating direction, wherein, when one of said first and second driving piezoelectric elements is driven in an expanded state, another of said first and second driving piezoelectric elements is driven in a contracted state, wherein said first driving piezoelectric element and said second piezoelectric element are adjusted in their applied voltages so as to suppress an unnecessary oscillation which is generated in said detected oscillating direction.

6. An angular velocity sensor comprising:

a tuning-fork oscillator having arms extending in parallel to each other and joined to a stationary body through a trunk;

first and second driving piezoelectric elements having a plural-layer laminated structure and arranged only on said trunk with a gap therebetween, said gap having a width extending in a direction of said arms for driving and oscillator to oscillate in a driven oscillating direction; and detecting piezoelectric elements having a plural-layer laminated structure and arranged on said arms for detecting oscillations of said oscillator in a detected oscillating direction perpendicular to said driven oscillating direction, wherein said plural layers of each of said first and second driving piezoelectric elements are laminated along said detected oscillating direction and are elongated along said driven oscillating direction, and said plural layers of said detecting piezoelectric elements are laminated along said detected oscillating direction, wherein, when one of said first and second driving piezoelectric elements is driven in an expanded state, another of said first and second driving piezoelectric elements is driven in a contracted state, wherein said first driving piezoelectric element and said second piezoelectric element are adjusted in their areas so as to suppress an unnecessary oscillation which is generated in said detected oscillating direction.

7. An angular velocity sensor comprising:

a tuning-fork oscillator having arms extending in parallel to each other and joined to a stationary body through a trunk;

first and second driving piezoelectric element having a plural-layer laminated structure and arranged only on said trunk with a gap therebetween, said gap having a width extending in a direction of said arms for driving said oscillator to oscillate in a driven oscillating direction; and detecting piezoelectric elements having a plural-layer laminated structure and arranged on said arms for detecting oscillations of said oscillator in a detected oscillating direction perpendicular to said driven oscillating direction, wherein said plural layers of each of said first and second driving piezoelectric elements are laminated along said detected oscillating direction and are elongated along said driven oscillating direction, and said plural layers of said detecting piezoelectric elements are laminated along said detected oscillating direction, and wherein when one of said first and second driving piezoelectric elements is driven in an expanded state, another of said first and second driving piezoelectric elements is driven in a contracted state, and wherein there is a plurality of at least said first driving piezoelectric elements along said driven oscillating direction, and each of said first driving piezoelectric elements is adjusted in its applied voltage so as to suppress an unnecessary oscillation which is generated in said detected oscillating direction of said arms.

8. An angular velocity sensor comprising:

a tuning-fork oscillator having arms extending in parallel to each other and joined to a stationary body through a trunk;

first and second driving piezoelectric elements having a plural-layer laminated structure and arranged only on said trunk with a gap therebetween, said gap having a width extending in a direction of said arms for driving said oscillator to oscillate in a driven oscillating direction; and detecting piezoelectric elements having a plural-layer laminated structure and arranged on said arms for detecting oscillations of said oscillator in a detected oscillating direction perpendicular to said driven oscillating direction, wherein said plural layers of each of said first and second driving piezoelectric elements are laminated along said detected oscillating direction and are elongated along said driven oscillating direction, and said plural layers of said detecting piezoelectric elements are laminated along said detected oscillating direction, wherein when one of said first and second driving piezoelectric elements is driven in an expanded state, another of said first and second driving piezoelectric elements is driven in a contracted state, wherein there is a plurality of at least said first driving piezoelectric elements along said driven oscillating direction, and each of said first driving piezoelectric elements is adjusted in its area so as to suppress an unnecessary oscillation which is generated in said detected oscillating direction of said arms.

9. An angular velocity sensor according to claim 7 or 8, wherein said oscillator is made of a semiconductor substrate, and each of said driving and detecting piezoelectric elements is formed by laminating a thin film electrode material and a thin film piezoelectric material.

10. An angular velocity sensor according to claim 7 or 8, wherein each of said driving and detecting piezoelectric elements is formed by sandwiching a piezoelectric material between electrode materials.

11. An angular velocity sensor according to claim 7 or 8, wherein said oscillator is made of a semiconductor substrate, and at least a plurality of electrode wiring lines connected with said first and second driving piezoelectric elements and electrode wiring lines connected with said angular velocity detecting piezoelectric elements are covered on their surfaces with a shield film so that they are shielded from another electrode wiring lines.

12. An angular velocity sensor according to claim 11, wherein said electrode wiring lines to be shielded are covered on their surfaces with a conductive film through an insulating film, and said conductive film is electrically connected with said semiconductor substrate to serve as said shield film.

13. An angular velocity sensor according to claim 7 or 8, wherein said first and second driving piezoelectric elements are arranged only on said surface of said trunk so that they are positioned between respective center lines of said arms.

14. An angular velocity sensor according to claim 7 or 8, wherein each of said arms includes a wide arm portion extending from said trunk, a narrow arm portion extending from said wide arm portion and made narrower than said wide arm portion, and a mass portion jointed to said narrow arm portion, and said detecting piezoelectric elements are mounted on said wide arm portions.

* * * * *